United States Patent
Ando et al.

(10) Patent No.: US 7,853,527 B2
(45) Date of Patent: *Dec. 14, 2010

(54) INFORMATION PROCESSING APPARATUS, INFORMATION PROCESSING METHOD, PROGRAM RECORDING MEDIUM, AND DATA RECORDING MEDIUM

(75) Inventors: Kazutaka Ando, Kanagawa (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 386 days.

This patent is subject to a terminal disclaimer.

(21) Appl. No.: 12/011,375

(22) Filed: Jan. 25, 2008

(65) Prior Publication Data

US 2008/0212443 A1    Sep. 4, 2008

Related U.S. Application Data

(63) Continuation of application No. 11/502,003, filed on Aug. 10, 2006, now Pat. No. 7,356,509, which is a continuation of application No. 10/016,220, filed on Oct. 30, 2001, now Pat. No. 7,130,476.

(30) Foreign Application Priority Data

Oct. 31, 2000  (JP) .............................. 2000-332483

(51) Int. Cl.
*G06Q 99/00*   (2006.01)
(52) U.S. Cl. ................ 705/50; 705/1; 705/51; 705/52; 705/57; 705/59; 380/231; 382/254
(58) Field of Classification Search ............. 705/1, 705/51, 52, 57, 59; 380/231; 382/254
See application file for complete search history.

(56) References Cited

U.S. PATENT DOCUMENTS 5,991,458 A    11/1999    Kunitake et al. ............ 382/254

(Continued)

FOREIGN PATENT DOCUMENTS

EP    0352937    12/1989

(Continued)

OTHER PUBLICATIONS

Hobby et al., "Enhancing Degraded Document Images via Bitmap Clustering and Averaging", 1997, Fourth International Conference on Document Analysis and Recognition.

(Continued)

*Primary Examiner*—Jalatee Worjloh
(74) *Attorney, Agent, or Firm*—Frommer Lawrence & Haug LLP; William S. Frommer; Paul A. Levy

(57) ABSTRACT

A management center registers user information that includes user identification information for identifying a user terminal and improvement-information identification information for identifying improvement information recorded in an optical disk and processed by the user terminal. When a user terminal requests improvement information through a network, the management center searches for another user terminal that can provide necessary information, according to user information, and obtains the improvement information from the another user terminal searched for, through the network. The management center then provides the obtained improvement information for the user terminal that requested it, through the network.

3 Claims, 19 Drawing Sheets

U.S. PATENT DOCUMENTS

| | | | |
|---|---|---|---|
| 6,501,856 B2 | 12/2002 | Kuwano et al. | 382/194 |
| 6,744,891 B1 * | 6/2004 | Allen | 380/231 |
| 7,127,108 B2 | 10/2006 | Kinjo et al. | 382/203 |
| 2004/0103305 A1 | 5/2004 | Ginter et al. | 713/200 |
| 2004/0136604 A1 * | 7/2004 | Kuwata et al. | 382/254 |

FOREIGN PATENT DOCUMENTS

| | | |
|---|---|---|
| EP | 0 352 937 | 1/1990 |
| JP | 2-239737 | 9/1990 |
| JP | 8-8852 | 1/1996 |
| JP | 8-123484 | 5/1996 |
| JP | 9-64749 | 3/1997 |
| JP | 9 138827 | 5/1997 |
| JP | 9-182050 | 7/1997 |
| JP | 10-83197 | 3/1998 |
| JP | 10-135944 | 5/1998 |
| JP | 10-233058 | 9/1998 |
| JP | 10-285043 | 10/1998 |
| JP | 10-313251 | 11/1998 |
| JP | 10-333769 | 12/1998 |
| JP | 11-98136 | 4/1999 |
| JP | 11-126084 | 5/1999 |
| JP | 11-213558 | 8/1999 |
| JP | 2000-115093 | 4/2000 |
| JP | 2000-123481 | 4/2000 |
| JP | 2000-224339 | 8/2000 |
| WO | WO99/09718 | 2/1999 |

OTHER PUBLICATIONS

Hobby et al., "Degraded Character Image Restoration", 1996, Proceedings of the Fifth Annual symposium on Document Analysis and Image Retrieval.

Hobby et al., "Enhancing Degraded Document Images via Bitmap Clustering and Averaging" 1997, Fourth International Conference on Document Analysis and Recognition.

Hobby et al., "Degraded Character Image Restoration", 1996, Proceedings of the Fifth Annual Symposium on Document Analysis and Image Retrieval.

Rui Ueyama, Keyword to understand with a picture, ASCII vol. 24, No. 11, ASCII Co., Ltd., Oct. 20, 2000, vol. 24, pp. 184-185.

* cited by examiner

INFORMATION PROCESSING APPARATUS, INFORMATION PROCESSING METHOD, PROGRAM RECORDING MEDIUM, AND DATA RECORDING MEDIUM

This is a continuation of application Ser. No. 11/502,003, filed Aug. 10, 2006, now U.S. Pat. No. 7,356,509 which is a continuation of application Ser. No. 10/016,220, filed Oct. 30, 2001, now U.S. Pat. No. 7,130,476, granted Oct. 31, 2006, with a claim of priority under 35 USC 119 to Japanese Application 2000-332483, filed in Japan on Oct. 31, 2000, the entirety thereof being incorporated herein by reference.

BACKGROUND OF THE INVENTION

1. Field of the Invention

The present invention relates to information processing apparatuses, information processing methods, program recording media, and data recording media, and more particularly, to an information processing apparatus, an information processing method, a program recording medium, and a data recording medium which allow the users to buy and sell to and from each other improvement information used for improving the quality of purchased data.

2. Description of the Related Art

Conventionally, musical-piece data, for example, is recorded into recording media, such as compact discs (CDs) and offered to the users. In these days, as the Internet has been widely used and a compression/decompression technology has progressed, contents such as musical-piece data have been increasingly offered through networks.

In such an environment, it is expected that a new market will be developed and a new business will be made if a system in which the users can buy and sell purchased data to and from each other is provided. More specifically, in the system, for example, a user buys musical-piece data by a recording medium such as a CD or through a network, another user adds improvement information for improving the sound quality of the musical-piece data, and the users can buy and sell the improvement information to and from each other.

SUMMARY OF THE INVENTION

The present invention has been made in consideration of the above situation. Accordingly, it is an object of the present invention to allow the users to buy and sell to and from each other improvement information for improving the quality of purchased data.

The foregoing object is achieved in one aspect of the present invention through the provision of an information processing apparatus including reading means for reading data and improvement information used for improving the quality of the data from a recording medium which stores the data and the improvement information; improvement-information requesting means for requesting another improvement information used for improving the quality of the data read by the reading means; and quality improving means for improving the quality of the data according to at least the improvement information and the another improvement information obtained according to a request made by the improvement-information requesting means and for outputting high-quality data.

The foregoing object is achieved in another aspect of the present invention through the provision of an information processing apparatus including reading means for reading data and improvement information used for improving the quality of the data from a recording medium which stores the data and the improvement information; improvement-information requesting means for requesting another improvement information used for improving the quality of the data read by the reading means; quality improving means for improving the quality of the data according to at least the improvement information and the another improvement information obtained according to a request made by the improvement-information requesting means and for outputting high-quality data; and improvement-information sending means for sending the improvement information to another information processing apparatus.

The foregoing object is achieved in still another aspect of the present invention through the provision of an information processing apparatus including storage means for storing user information which includes user identification information used for identifying a user terminal, and improvement-information identification information used for identifying improvement information improving the quality of data processed in the user terminal; searching means for searching the storage means for the user information having the improvement information requested by the user terminal; improvement-information requesting means for requesting the improvement information from another user terminal corresponding to the user information searched for by the searching means; obtaining means for obtaining the improvement information from the another user terminal according to a request made by the improvement-information requesting means; and sending means for sending the improvement information obtained by the obtaining means to the user terminal.

The foregoing object is achieved in yet another aspect of the present invention through the provision of an information processing method including the steps of reading data and improvement information used for improving the quality of the data from a recording medium which stores the data and the improvement information; requesting another improvement information used for improving the quality of the read data; and improving the quality of the data according to at least the improvement information and the another improvement information obtained according to the request and outputting high-quality data.

The foregoing object is achieved in still yet another aspect of the present invention through the provision of an information processing method including the steps of reading data and improvement information used for improving the quality of the data from a recording medium which stores the data and the improvement information; requesting another improvement information used for improving the quality of the read data; improving the quality of the data according to at least the improvement information and the another improvement information obtained according to the request and outputting high-quality data; and sending the improvement information to another information processing apparatus.

The foregoing object is achieved in a further aspect of the present invention through the provision of an information processing method including the steps of searching storage means for user information having improvement information requested by a user terminal, the storage means storing user information which includes user identification information used for identifying the user terminal and improvement-information identification information used for identifying improvement information improving the quality of data processed in the user terminal; requesting the improvement information from another user terminal corresponding to the user information searched for; obtaining the improvement information from the another user terminal according to the request; and sending the obtained improvement information to the user terminal.

The foregoing object is achieved in a still further aspect of the present invention through the provision of a storage medium storing a computer-controllable program, the program including the steps of reading data and improvement information used for improving the quality of the data from a recording medium which stores the data and the improvement information; requesting another improvement information used for improving the quality of the read data; and improving the quality of the data according to at least the improvement information and the another improvement information obtained according to the request and outputting high-quality data.

The foregoing object is achieved in a yet further aspect of the present invention through the provision of a storage medium storing a computer-controllable program, the program including the steps of reading data and improvement information used for improving the quality of the data from a recording medium which stores the data and the improvement information; requesting another improvement information used for improving the quality of the read data; improving the quality of the data according to at least the improvement information and the another improvement information obtained according to the request and outputting high-quality data; and sending the improvement information to another information processing apparatus.

The foregoing object is achieved in a still yet further aspect of the present invention through the provision of a storage medium storing a computer-controllable program, the program including the steps of searching storage means for user information having improvement information requested by a user terminal, the storage means storing user information which includes user identification information used for identifying the user terminal and improvement-information identification information used for identifying improvement information improving the quality of data processed in the user terminal; requesting the improvement information from another user terminal corresponding to the user information searched for; obtaining the improvement information from the another user terminal according to the request; and sending the obtained improvement information to the user terminal.

The foregoing object is achieved in an additional aspect of the present invention through the provision of a storage medium storing data; and improvement information for improving the quality of the data and for improving the quality of another data stored in another storage medium.

According to the present invention, data and improvement information for improving the quality of the data are read, another improvement information for improving the quality of data is obtained, and the quality of the data is improved according to the improvement information and the another improvement information. Therefore, improvement information is allowed to be bought and sold.

DETAILED DESCRIPTION

Figure 1:
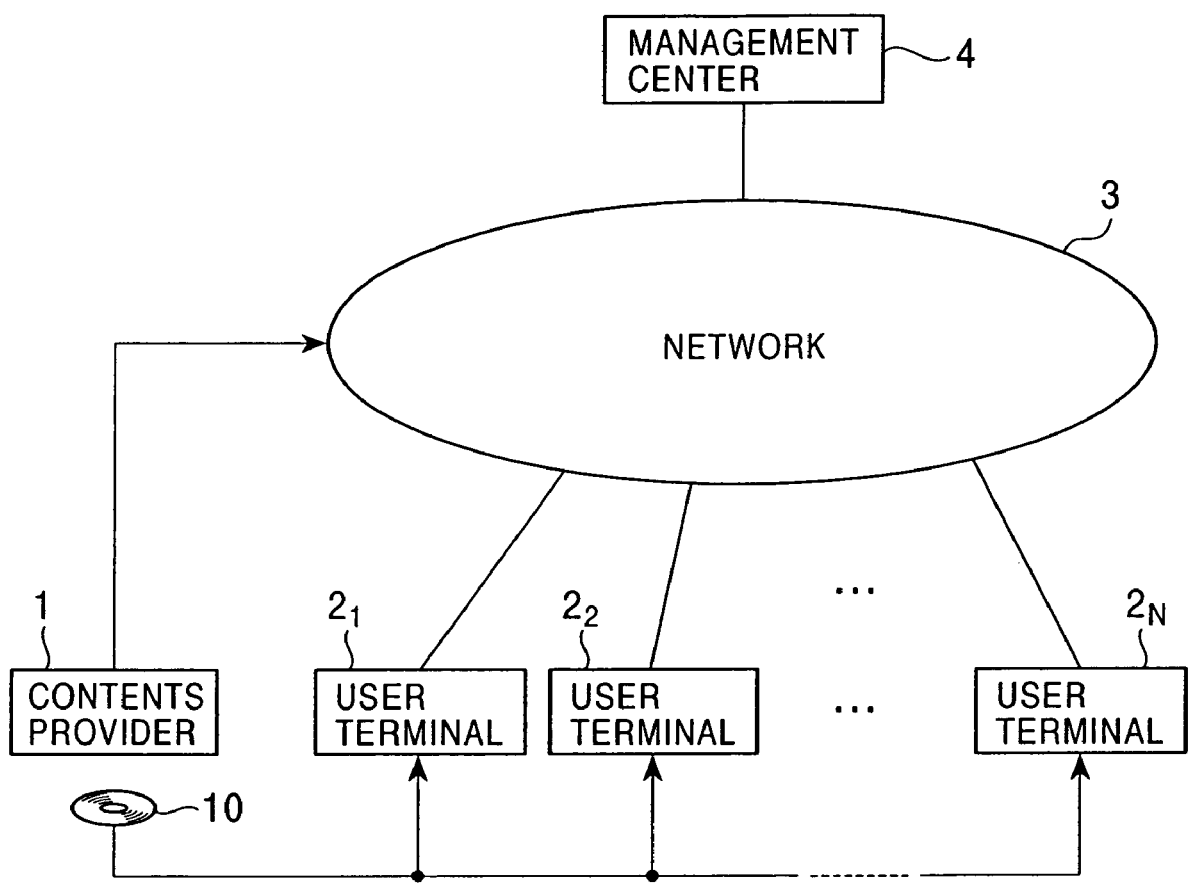
FIG. 1 is a view showing an example structure of a network system according to an embodiment of the present invention.

FIG. 1 shows an example structure of a network system (system refers to an object logically formed of a plurality of apparatuses irrespective of whether the apparatuses are disposed within a cabinet) according to an embodiment of the present invention.

A contents provider 1 offers to the users at user terminals $2_1$ to $2_N$ contents such as musical-piece data together with improvement information, described later. The contents provider 1 can transfer the musical-piece data and the improvement information through a network 3, such as the Internet, a CATV network, or a public network, or can transfer them by a recording medium 10, such as a CD, in which they have been recorded. In the following description, it is assumed that the musical-piece data and the improvement information are recorded into the recording medium 10 and distributed.

Each of the user terminals $2_1$ to $2_N$ (hereinafter collectively called a user terminal 2 if it is not necessary to identify each of them) reproduces (reads) the musical-piece data recorded into the recording medium 10 purchased from the contents provider 1. The recording medium 10 in which musical-piece data offered by the contents provider 1 has been recorded records the improvement information of the musical-piece data and improvement information for improving the sound quality of musical-piece data recorded into other recording media. The user terminal 2 performs improvement processing for improving the sound quality of the reproduced (read) musical-piece data by using the improvement information and outputs the musical-piece data.

The user terminal 2 obtains improvement information other than that recorded into the recording medium 10 which the user owns, through the network 3 from a management center 4 according to a request of the user, and performs improvement processing by using the improvement information. In addition, the user terminal 2 sends the improvement information recorded into the recording medium 10 which the user owns, to another user terminal 2 through the management center 4 according to a request of the management center 4.

The management center 4 mediates between user 2 through the network 3 for improvement information. The management center 4 also performs accounting processing for the consideration of improvement information transferred between user terminals 2.

Figure 2:
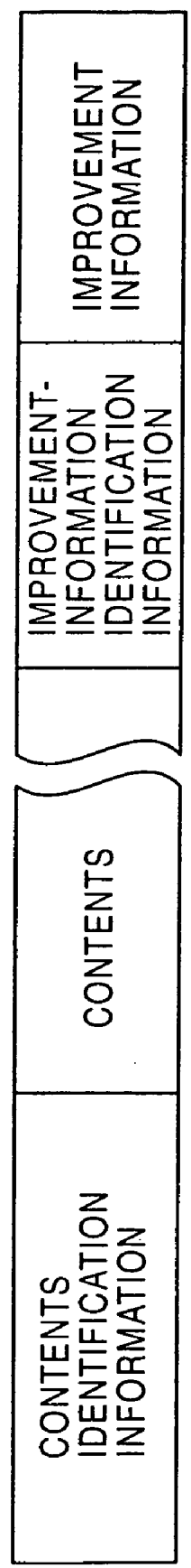
FIG. 2 is a view showing the format of data provided by a contents provider 1.

FIG. 2 shows the format of the data stream of musical-piece data offered by the contents provider 1. FIG. 2 shows the format of the data stream of one content, namely, one piece of musical-piece data in the present embodiment.

A data stream offered by the contents provider 1 is formed of a data set having contents identification information, contents, improvement-information-identification information, and improvement information.

The contents identification information, disposed at the top, is used for identifying the contents, disposed thereafter. When the contents are musical-piece data, an international standard recording code (ISRC), for example, can be used in the contents identification information.

Figure 3:
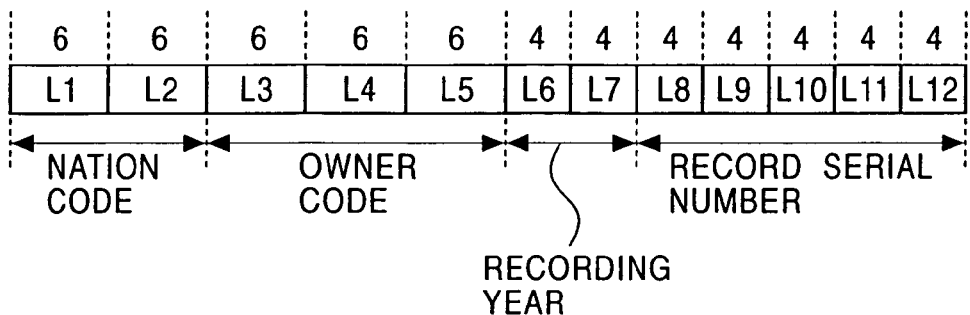
FIG. 3 is a view showing an ISRC format.

FIG. 3 shows the format of the ISRC.

In the ISRC, data L1 and L2 each having six bits indicates a nation code, data L3 to L5 each having six bits indicates an owner code, data L6 and L7 each having four bits indicates the year recording is performed, and data L8 to L12 each having four bits indicates a record serial number.

Back to FIG. 2, following the contents identification information, musical-piece data serving as the contents identified by the contents identification information is disposed. The improvement-information identification information is disposed after the contents. The improvement-information identification information indicates the type of the improvement information disposed thereafter.

The contents provider 1 divides the improvement information for improving the sound quality of the musical-piece data serving as the contents, and places each of a plurality of improvement-information pieces obtained as a result of division in a different data stream. In other words, the contents provider 1 divides the improvement information for a predetermined musical-piece data, adds each of the improvement-information pieces obtained as a result of division to the predetermined musical-piece data to form a plurality of types of data streams.

Therefore, to improve the sound quality of musical-piece data disposed in a certain type of data stream to the highest level, it is necessary to obtain improvement information disposed in all types of data streams generated for the musical-piece data.

All types of improvement-information pieces (disposed in all types of data streams) are required to improve the sound quality of musical-piece data to the highest level. The improvement-information identification information indicates the type of improvement information disposed thereafter.

The improvement information of which the type is indicated by the improvement-information identification information is disposed after the improvement-information identification information.

In the embodiment shown in FIG. 2, the improvement information is disposed after the musical-piece data. The improvement information can be disposed, for example, before the musical-piece data or at the middle of the musical-piece data. Alternatively, it can be divided and disposed at any positions in the musical-piece data in a dispersion manner. It is also possible that the improvement information is embedded into the musical-piece data by using an electronic watermark technology or the like.

The improvement information will be described below by referring to FIG. 4 to FIG. 9.

It is assumed as shown in FIG. 4(A) that the original data of musical-piece data is formed of 16 bits. In the 16 bits, the n-th bit counted from the most significant bit is indicated by $B_{\#n-1}$.

The original data having 16 bits is, for example, divided into six high-order bits B0 to B5 and 10 low-order bits B6 to B15. The 10 low-order bits B6 to B15 are further divided, for example, into five sets of two bits, B6 and B7, B8 and B9, B10 and B11, B12 and B13, and B14 and B15. These five sets of two bits serve as five types of improvement information. As shown in FIG. 4(B) to FIG. 4(F), the six high-order bits serve as musical-piece data serving as a content, and the five types of improvement information are added to the musical-piece data to form five types of data streams for the musical-piece data.

When improvement-information pieces are sequentially obtained in the order of B6 and B7, B8 and B9, B10 and B11, B12 and B13, and B14 and B15, the larger the number of obtained improvement-information pieces is, the more the sound quality of the musical-piece data is improved.

Figure 4:
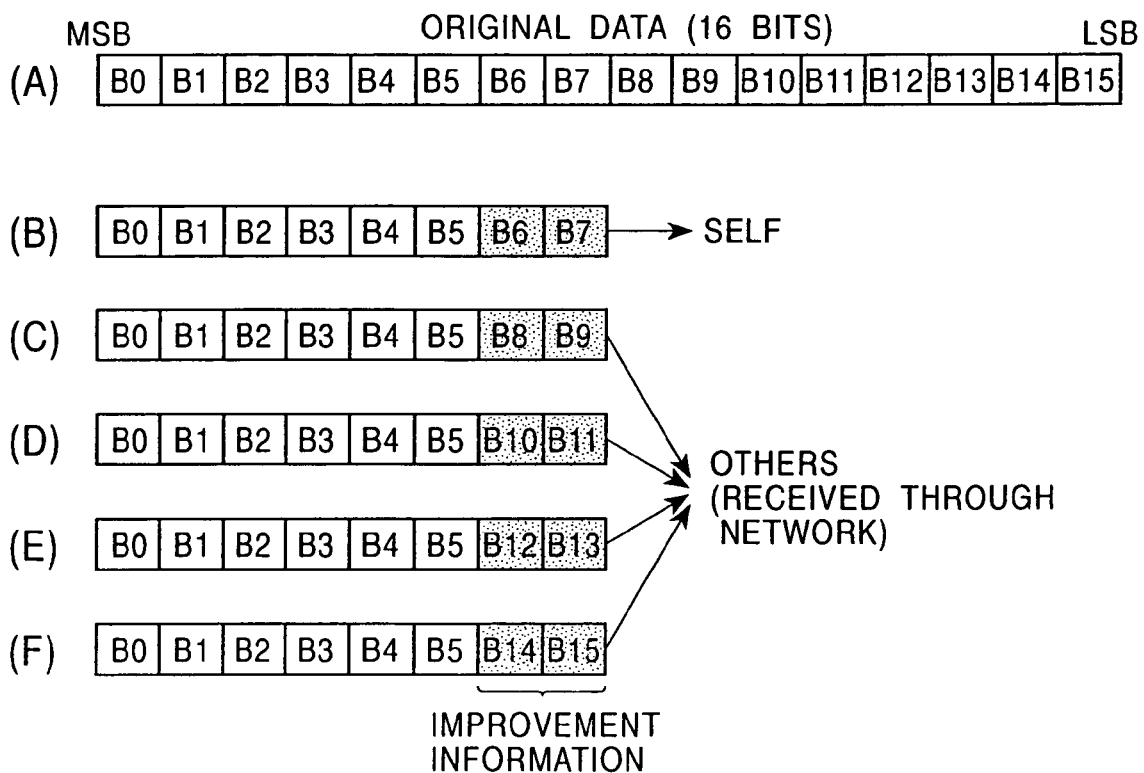
FIG. 4 is a view showing example improvement information.

In the embodiment shown in FIG. 4, it is possible that two-bit improvement information is attached as two low-order bits to six-bit musical-piece data serving as a content and eight-bit musical-piece data is handled in the user terminal 2. In this case, however, in musical-piece data having two low-order bits other than B6 and B7 improvement information, those two low-order bits (improvement information) are handled as noise.

In the above case, the 10 low-order bits are simply divided into five sets of two bits to make five types of improvement-information pieces. It is also possible that the 10 low-order bits are divided into five sets of 10 bits which are added to obtain the original value and the five sets serve as five types of improvement-information pieces. Also in this case, it is possible that 10-bit improvement information is attached as 10 low-order bits to six-bit musical-piece data serving as a content and 16-bit musical-piece data is handled in the user terminal 2.

In the embodiment shown in FIG. 4, improvement information for improving musical-piece data in terms of resolution (tone) in level has been described. Improvement information for improving musical-piece data in terms of resolution in a time domain can be employed.

Figure 5:
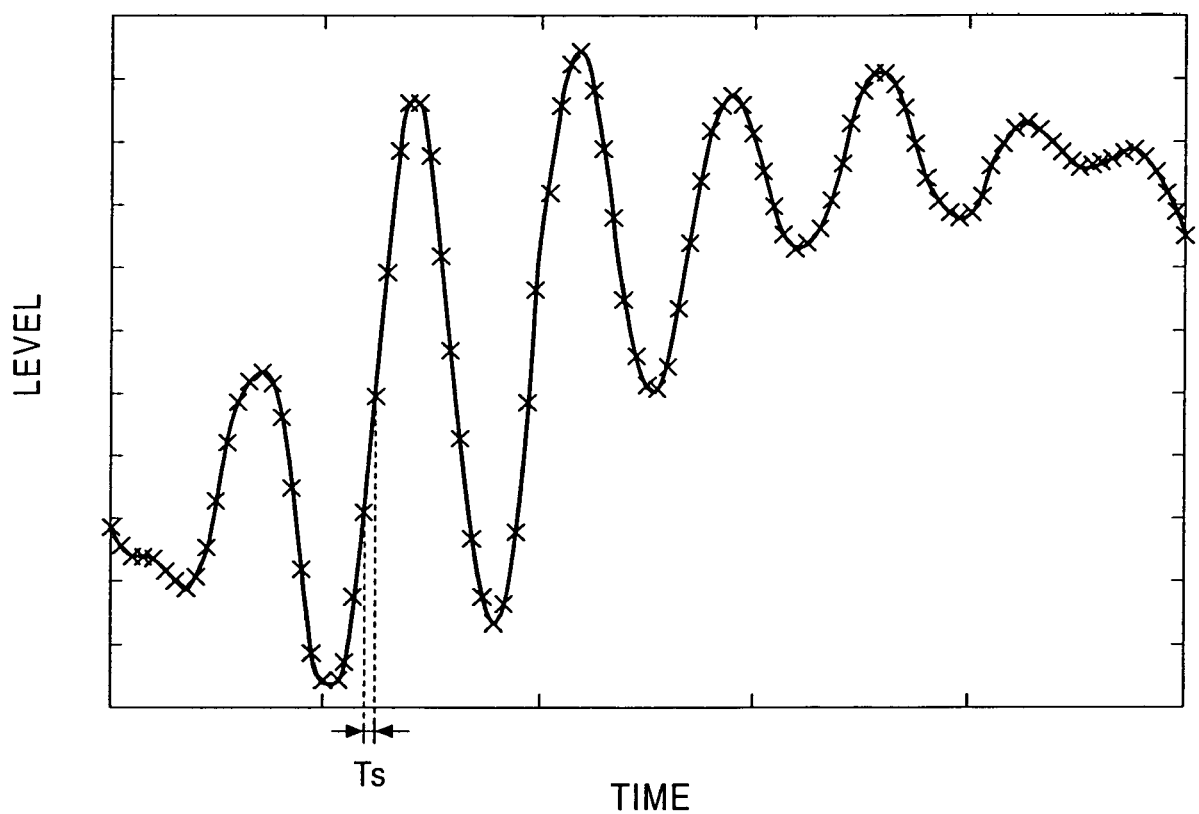
FIG. 5 is a view showing the original data of a musical piece.
Figure 6:
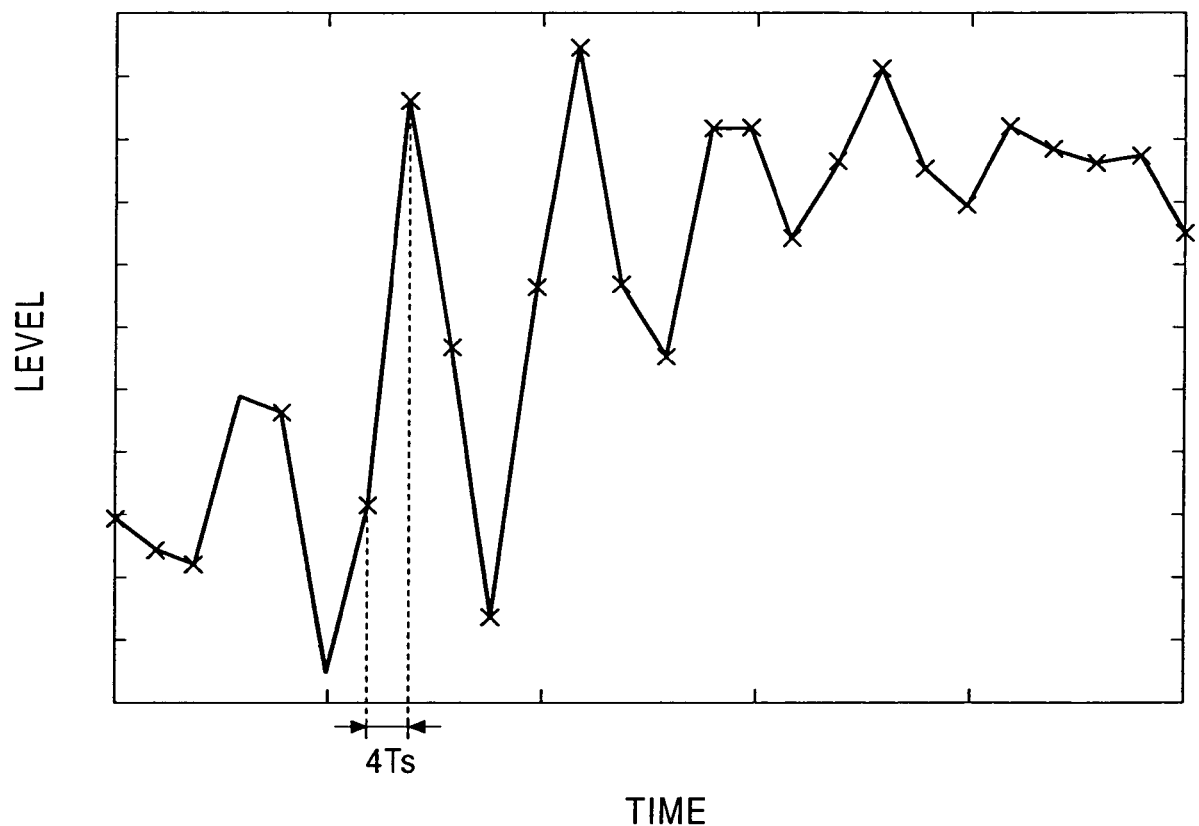
FIG. 6 is a view showing data obtained by sub-sampling the original data of the musical piece.
Figure 7:
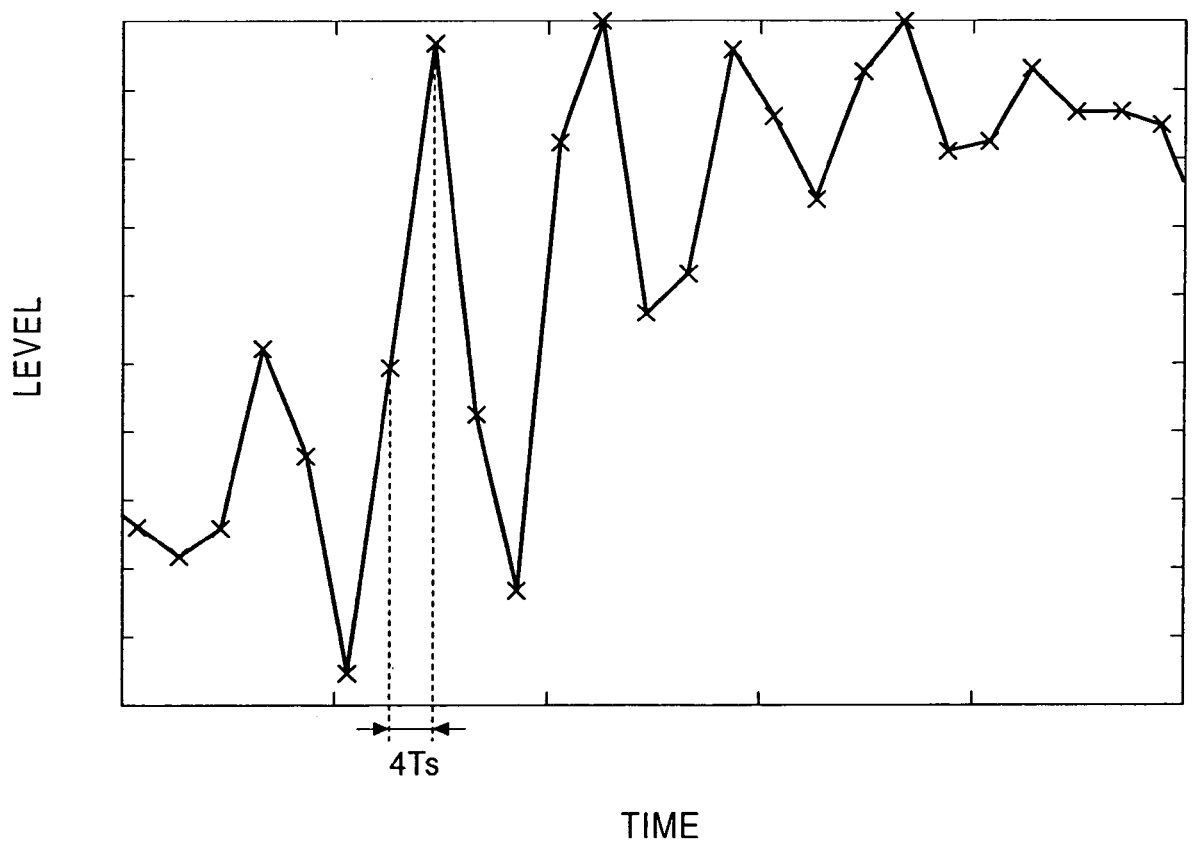
FIG. 7 is a view showing data obtained by sub-sampling the original data of the musical piece.
Figure 8:
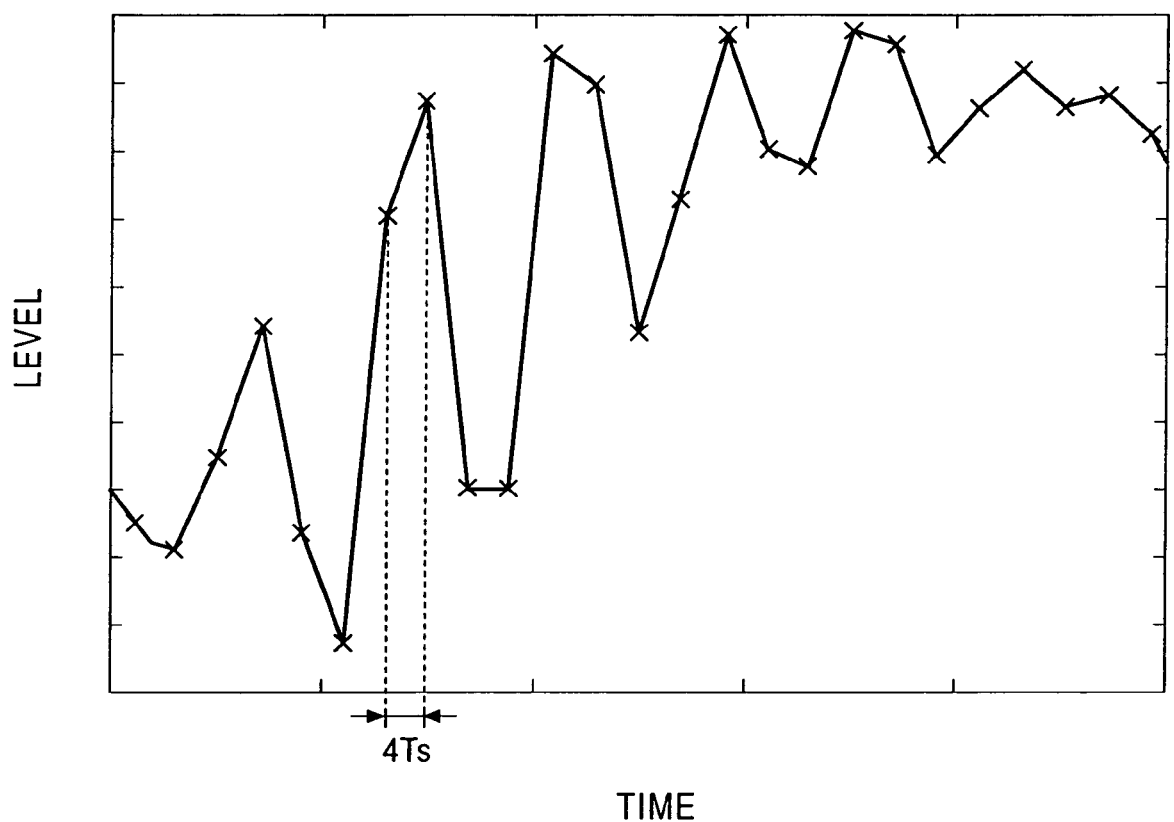
FIG. 8 is a view showing data obtained by sub-sampling the original data of the musical piece.
Figure 9:
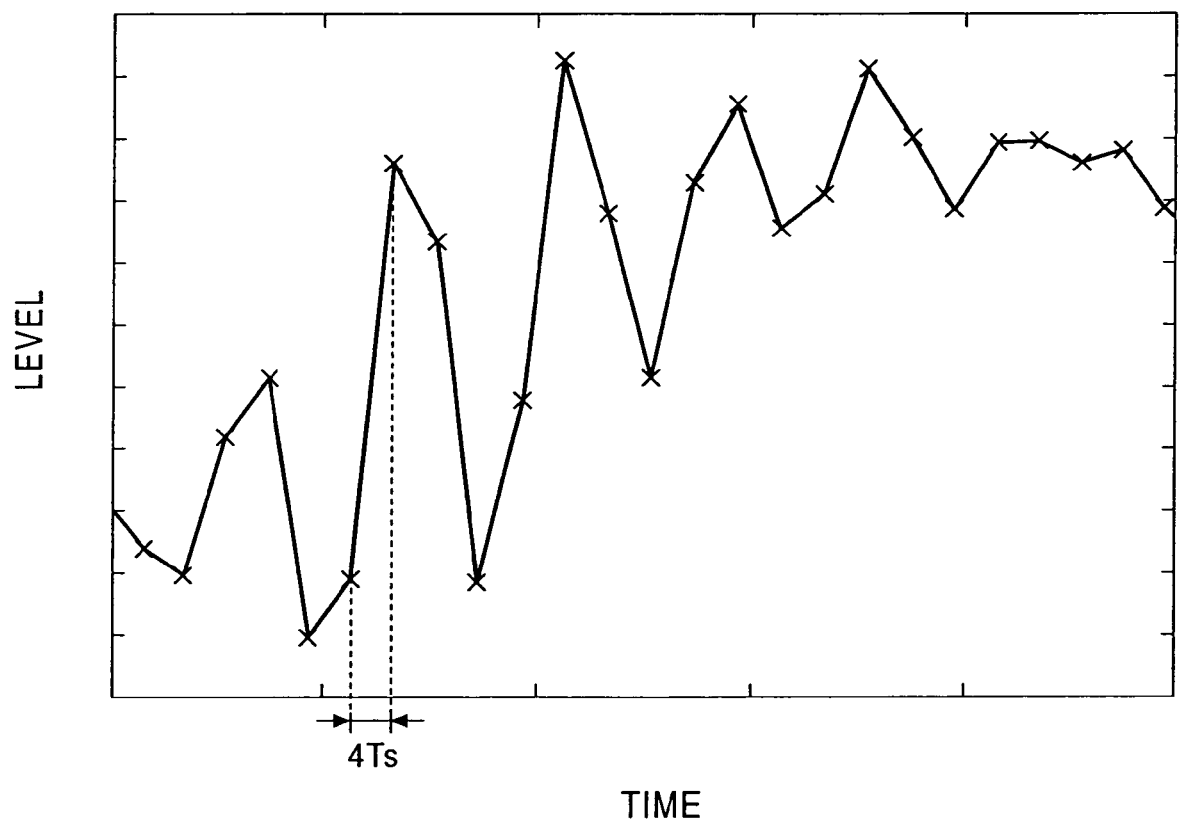
FIG. 9 is a view showing data obtained by sub-sampling the original data of the musical piece.

When it is assumed, for example, as shown in FIG. 5 that the original data of musical-piece data is sampled at an interval of time Ts, it is possible that the original data is sub-sampled at an interval of time 4Ts with a phase being changed, as shown in FIG. 6 to FIG. 9, and four obtained sub-sampling results are employed as four types of musical-piece data and improvement information disposed in data streams. In this case, the larger the number of obtained improvement-information pieces is, the better the sound quality becomes. When the four types of improvement information are all obtained, the best sound quality is implemented.

Since the musical-piece data and the improvement information are not divided in the embodiment shown in FIG. 5 to FIG. 9, either musical-piece data (content) or improvement information can be omitted in the data format shown in FIG. 2.

As described above, if sampling results are just provided as musical-piece data, an inconvenience such as aliasing occurs.

To prevent such an inconvenience, it is generally preferred that sampling results be filtered by a low pass filter (LPF). When four sub-sampling results are filtered, it is difficult to restore the original data just by collecting the four sub-sampling results. Therefore, in this case, it is preferred that data close to the original data be obtained, for example, by the following class-classification adaptive processing in the user terminal 2 by using the four filtered sub-sampling results.

Class-classification adaptive processing is formed of class-classification processing and adaptive processing. Data is classified into classes by its characteristics in the class-classification processing, and the adaptive processing is applied to each class. An incorporated reference of the class-classification adaptive processing is U.S. Pat. No. 5,666,164.

In the adaptive processing, for example, musical-piece data (hereinafter called low-resolution data, if necessary) having a low time resolution (resolution in the time domain) is linearly coupled with predetermined prediction coefficients to obtain the predicted value of high-resolution musical-piece data (hereinafter called high-resolution data, if necessary), which has been improved in time resolution, and musical-piece data having a higher time resolution than the low-resolution data is obtained.

More specifically, it is assumed that high-resolution data serves as master data, low-resolution data (sub-sampling results of high-resolution data) obtained by reducing the time resolution of the high-resolution data serves as apprentice data, and the prediction value E[y] of the high-resolution data "y" is obtained by a linear first-order coupling model defined by linear coupling of a set of some low-resolution data $x_1$, $x_2$, ..., and predetermined prediction coefficients $w_1$, $w_2$, .... In this case, the prediction value E[y] can be expressed by the following expression.

$$E[y] = w_1 x_1 + w_2 x_2 + \ldots \quad (1)$$

To generalize the expression (1), when a matrix "W" formed of a set of prediction coefficients "$w_j$," a matrix "$X_{ij}$" formed of a set of apprentice data, and a matrix "Y'" formed of a set of prediction values $E[y_j]$ are defined in the following expressions, $$X = \begin{bmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{bmatrix}$$

$$W = \begin{bmatrix} w_1 \\ w_2 \\ \cdots \\ w_J \end{bmatrix}, Y' = \begin{bmatrix} E[y_1] \\ E[y_2] \\ \cdots \\ E[y_J] \end{bmatrix}$$

the following observation equation is satisfied.

$$XW = Y' \quad (2)$$

The element $x_{ij}$ of the matrix X indicates the j-th apprentice data in the i-th set of apprentice data (set of apprentice data used for predicting the i-th master data $y_i$); the element $w_j$ of the matrix W indicates a prediction coefficient to be multiplied by the j-th apprentice data in the set of apprentice data; $y_i$ indicates the i-th master data, and therefore, $E[y_i]$ indicates the prediction value of the i-th master data. In the left side of the expression (1), y represents the element $y_i$ of the matrix Y with the suffix "i" being omitted. In the right side of the expression (1), $x_1$, $x_2$, ... represent the elements $x_{ij}$ of the matrix X with the suffix "i" being omitted.

The least squares method is applied to this observation equation to obtain a prediction value E[y] close to the high-resolution data "y." In this case, when a matrix "Y" formed of a set of the true values "y" of the high-resolution data serving as master data, and a matrix "E" formed of a set of the remainders "e" of the prediction values E[y] against the true values "y" in the high-resolution data are defined in the following way, $$E = \begin{bmatrix} e_1 \\ e_2 \\ \cdots \\ e_I \end{bmatrix}, Y = \begin{bmatrix} y_1 \\ y_2 \\ \cdots \\ y_I \end{bmatrix}$$

the following remainder equation is satisfied from the expression (2).

$$XW = Y + E \quad (3)$$

In this case, prediction coefficients $w_j$ used to obtain a prediction value E[y] close to the true value "y" of the high-resolution data are obtained when the following error square is made minimum.

$$\sum_{i=1}^{I} e_i^2$$

Therefore, when the result obtained by differentiating the above error square by the prediction coefficient $w_j$ is zero, in other words, the prediction coefficient $w_j$ which satisfies the following expression is the most appropriate value for obtaining a prediction value E[y] close to the true value "y" of the high-resolution data.

$$e_1 \frac{\partial e_1}{\partial w_j} + e_2 \frac{\partial e_2}{\partial w_j} + \ldots + e_I \frac{\partial e_I}{\partial w_j} = 0 \, (i = 1, 2, \ldots, j) \quad (4)$$

When the expression (3) is differentiated by the prediction coefficient $w_j$, the following expression is satisfied.

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \quad (5)$$

From the expressions (4) and (5), the expression (6) is obtained.

$$\sum_{i=1}^{I} e_i x_{i1} = 0, \sum_{i=1}^{I} e_i x_{i2} = 0, \ldots, \sum_{i=1}^{I} e_i x_{iJ} = 0 \quad (6)$$

In addition, when the relationships among the apprentice data "$x_{ij}$," the prediction coefficients "$w_j$," the master data "$y_i$," and the remainders "$e_i$" in the remainder equation (3) are taken into account, the following normal equations are obtained from the expression (6).

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J = \left(\sum_{i=1}^{I} x_{i2}y_i\right) \\ \quad \ldots \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J = \left(\sum_{i=1}^{I} x_{iJ}y_i\right) \end{cases} \quad (7)$$

When a matrix (covariance matrix) A and a vector "v" are defined as follows:

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix}$$

$$v = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

and the vector W is defined as shown in expression (1), the normal equations (7) can be expressed by the following expression.

$$AW = v \quad (8)$$

The same number of the normal equations (7) as that of the prediction coefficients "$w_j$" to be obtained can be formulated with a certain number of sets of apprentice data $x_{ij}$ and master data $y_i$ being prepared. Therefore, by solving the equation (8) for the vector W (it is required that the matrix A be nonsingular in the expression (8) to solve the expression (8)), the most appropriate prediction coefficients "$W_j$" is obtained. It is possible to use, for example, a sweep off method (Gauss-Jordan deletion method) to solve the equation (8).

In the adaptive processing, the most appropriate prediction coefficients $w_j$ are obtained as described above, and then the prediction coefficients $w_j$ are used to obtain a prediction value E[y] close to the true value "y" of the high-resolution data by the expression (1).

The adaptive processing differs, for example, from simple interpolation processing in that components not included in low-resolution data but included in high-resolution data are reproduced. More specifically, the adaptive processing seems to be the same as interpolation processing using a so-called interpolation filter when only the expression (1) is considered, but since the prediction coefficients $w_j$, which correspond to the tap coefficients of the interpolation filter, are obtained by learning with the use of the master data "y," components included in the high-resolution data are reproduced. From this point of view, it can be said that the adaptive processing has a resolution creating effect.

The case has been described for the adaptive processing, in which time resolution is improved. According to the adaptive processing, master data and apprentice data used for obtaining prediction coefficients can be changed to improve, for example, resolution in a level direction.

As described above, the class-classification adaptive processing can be used for obtaining data close to the original data by using four filtered sub-sampling results. In addition, it can be used as improvement processing for improving the quality of musical-piece data.

When the class-classification adaptive processing is employed as improvement processing, prediction coefficients can be used as improvement information, and, for example, a selection pattern of low-resolution data with which the sum-of-products calculation is applied to the prediction coefficients according to the expression (1) can also be used. In the class classification of the class-classification adaptive processing, several sets of low-resolution data are selected, and the low-resolution data is classified according to the distribution pattern in level of the several sets of low-resolution data. The selection pattern of low-resolution data used for the class classification can also be used as improvement information. In the class classification, the low-resolution data is classified according to the levels of the low-resolution data itself or the differences between the levels. A method employed in the class classification or a class-classification result can further be used as improvement information.

In the present embodiment, musical-piece data, which is audio data, serves as contents of which the quality is to be improved. Image data and others can also be employed as contents of which the quality is to be improved. When image data serves as the contents, it is possible to use, for example, motion vectors or discrete cosine transform (DCT) coefficients as improvement information for improving the quality of the image data. More specifically, when motion compensation or DCT is applied to image data which serves as contents, low-order bits of motion vectors used for the motion compensation, or high-order DCT coefficients can be used as improvement information.

Figure 10:
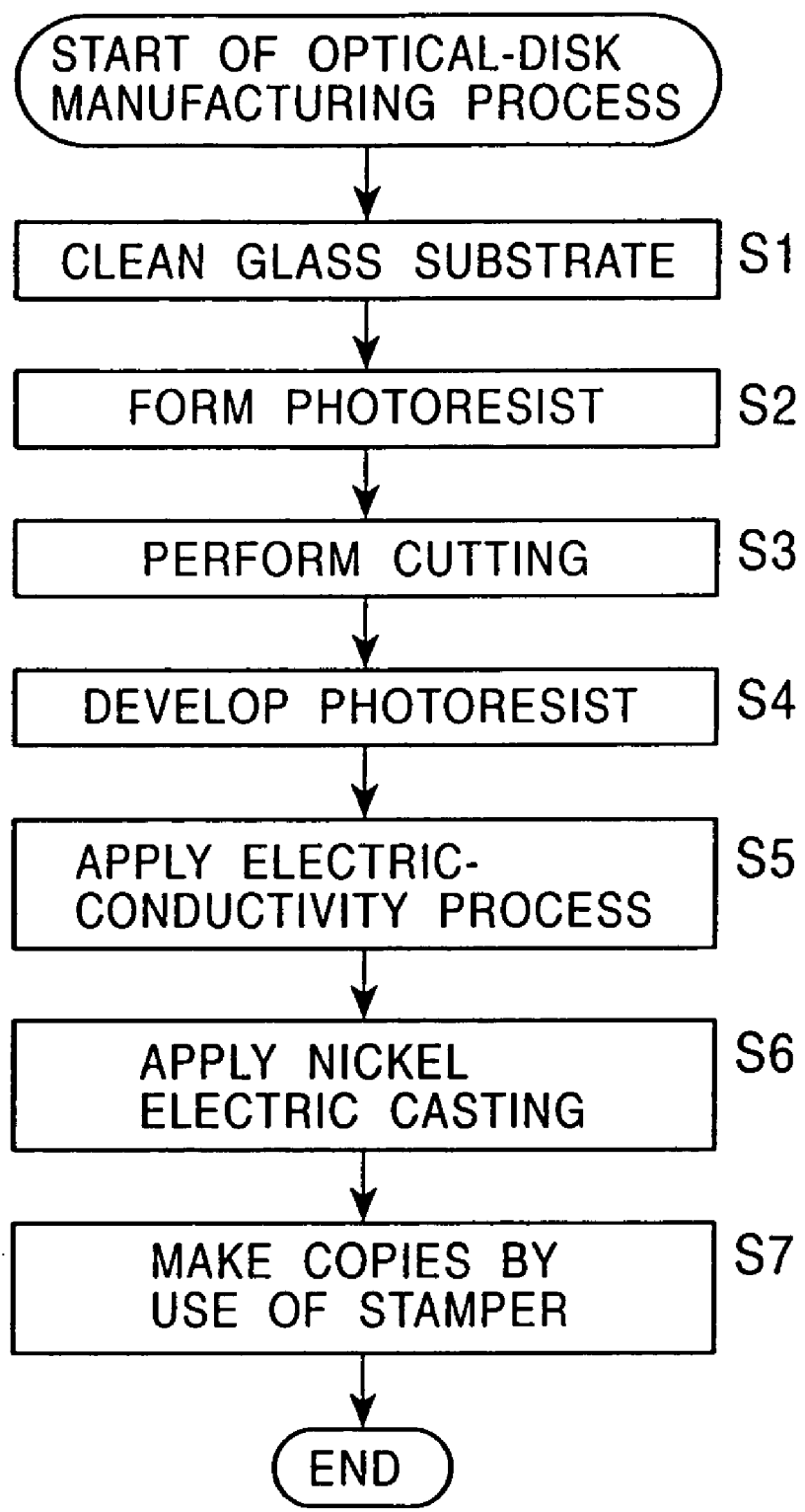
FIG. 10 is a flowchart of a manufacturing process of an optical disk 10.

The contents provider 1 provides the recording medium 10 in which a data stream having the format shown in FIG. 2 is recorded. It is assumed that the recording medium 10 is an optical disk, for example. Its manufacturing process will be described next by referring to a flowchart shown in FIG. 10.

In step S1, the contents provider 1 cleans a disc-shaped glass substrate. The process proceeds to step S2, and photoresist is formed on the glass substrate. Then, the process proceeds to step S3, and the photoresist formed on the glass substrate is cut (exposed) according to a data stream to be recorded in an optical disk. The process proceeds to step S4, and the photoresist cut in step S3 is developed. The process proceeds to step S5, and an electric-conductivity process is applied to the developed photoresist. Then, the process proceeds to step S6, and nickel electric casting is applied to the glass substrate on which the photoresist to which electric-conductivity process has been applied is formed to form a (nickel) stamper. The process proceeds to step S7, and identical optical-disks are formed by using the stamper made in step S6.

Improvement-information transfer achieved between user terminals 2 through the management center 4 shown in FIG. 1 will be described next by referring to FIG. 11.

In the following description, a user terminal which receives improvement information is called a user terminal $2_k$, and a user terminal which offers the improvement information is called a user terminal $2_m$.

The user terminal $2_k$ which wants to obtain improvement information requests the improvement information from the management center 4 through the network 3. When the management center 4 receives a request for the improvement information from the user terminal $2_k$, the management center 4 searches for the user terminal $2_m$ having the required improvement information, and requests the improvement information from the user terminal $2_m$ through the network 3. The user terminal $2_m$ sends the improvement information to the management center 4 through the network 3 in response to the request for the improvement information sent from the management center 4. The management center 4 receives the improvement information and sends it to the user terminal $2_k$ through the network 3.

Figure 11:
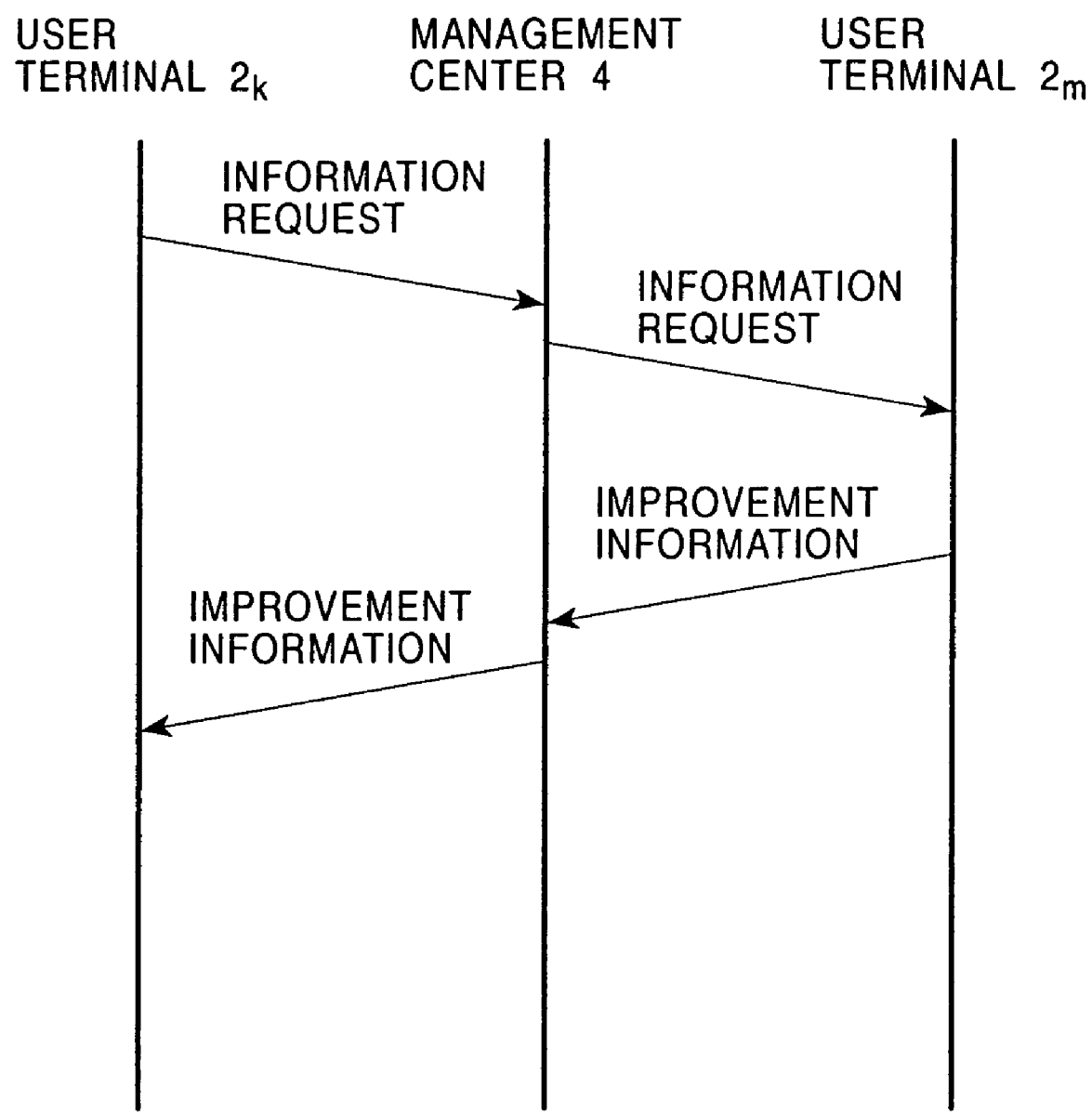
FIG. 11 is a view showing improvement-information transfer between user terminals 2 through a management center 4.

In the embodiment shown in FIG. 11, the management center 4 relays the improvement information sent from the user terminal $2_m$, to the user terminal $2_k$. It is also possible that the user terminal $2_m$ sends the improvement information directly to the user terminal $2_k$ through the network 3.

The improvement information can be sent as is. It can be sent after it is encrypted. As an encryption method, either a public-key encryption method such as a Rivest-Shamir-Adleman (RSA) method or a private-key encryption method such as a data-encryption-standard (DES) method can be used.

Figure 12:
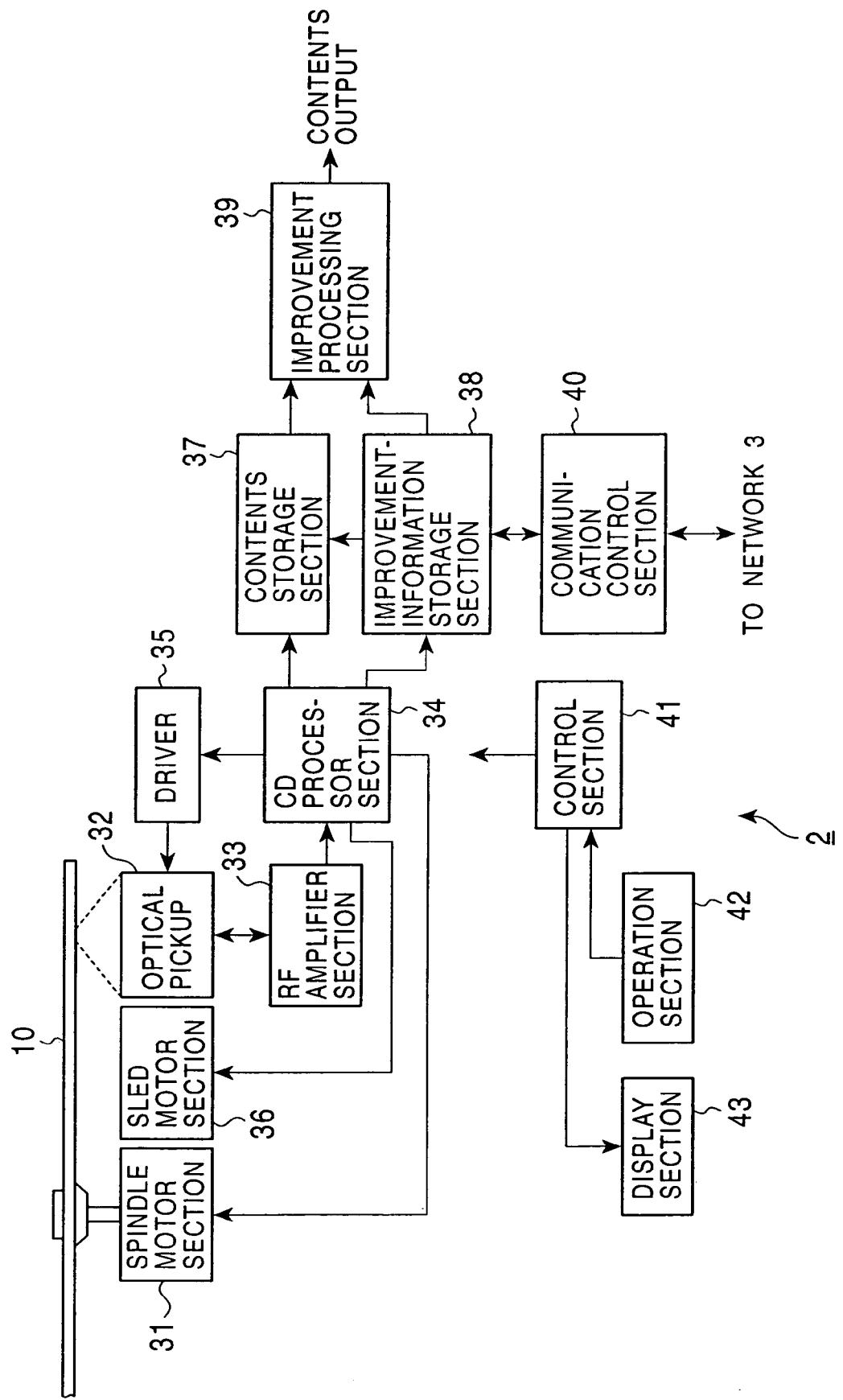
FIG. 12 is a block diagram showing an example structure of a user terminal 2.

FIG. 12 shows an example structure of the user terminal 2 shown in FIG. 1. The example structure of the user terminal 2 applies when the recording medium 10 provided by the contents provider 1 is an optical disk.

An optical disk (hereinafter called an optical disk 10, if necessary) serving as the recording medium 10 is rotated at a predetermined speed by a spindle motor section 31. The spindle motor section 31 is driven by a rotation control signal sent from a CD processor section 34 so that the optical disk 10 has the predetermine rotation speed.

An optical pickup 32 emits laser light having a controlled amount of light to the optical disk 10. This laser light is reflected from the optical disk 10. Reflected light is incident on an optical detection section (not shown) of the optical pickup 32. The optical detection section of the optical pickup 32 is formed of a divided photodetector, generates a voltage signal corresponding to the reflected light by photoelectric conversion and current-voltage conversion, and sends the signal to a radio-frequency (RF) amplifier section 33.

The RF amplifier section 33 generates a read signal (so-called a sum signal), a focus error signal, and a tracking error signal according to the voltage signal sent from the optical pickup 32, and sends them to the CD processor section 34.

The CD processor section 34 generates a focus control signal used for controlling an objective lens (not shown) of the optical pickup 32 such that the focal point of the laser light is located at a recording layer of the optical disk 10, according to the focus error signal sent from the RF amplifier section 33, and sends it to a driver 35. The CD processor section 34 also generates a tracking control signal used for controlling the objective lens of the optical pickup 32 such that the laser light is emitted to the center position of a desired track, according to the tracking error signal sent from the RF amplifier section 33, and sends it to the driver 35. The CD processor section 34 further generates a sled control signal used for moving the optical pickup 32 in the radial direction of the optical disk 10 such that a position to which the laser light is emitted does not exceed a tracking control area, and sends it to a sled motor section 36. The sled motor section 36 moves the optical pickup 32 in the radial direction of the optical disk 10 according to the sled control signal sent from the CD processor section 34.

The driver 35 generates a focus driving signal according to the focus control signal sent from the CD processor section 34, and also generates a tracking driving signal according to the tracking control signal sent also from the CD processor section 34. The focus driving signal and the tracking driving signal are sent to an actuator (not shown) in the optical pickup 32, and the position of the objective lens is controlled according to the signals. More specifically, with this control, the laser light output from the optical pickup 32 is controlled so as to focus on the center position of a desired track.

The CD processor section 34 applies asymmetry compensation and binarization to the read signal sent from the RF amplifier section 33 to convert it to a digital signal. Then, the CD processor section 34 applies eight-to-fourteen modulation (EFM) to the digital signal, and performs cross-interleave-Reed-Solomon-code (CIRC) error-correcting processing.

Musical-piece data serving as a content, obtained when the CD processor section 34 performs the error-correcting processing is sent to a contents storage section 37 and stored (recorded). Contents identification information, improvement-information identification information, and improvement information obtained when the CD processor section 34 performs the error-correcting processing are sent to an improvement-information storage section 38 and stored (recorded).

The CD processor section 34 detects a signal used for frame synchronization from the read signal sent from the RF amplifier section 33, generates a rotation control signal according to the read signal such that the optical disk 10 has a desired rotation speed, and sends it to the spindle motor section 31.

An improvement processing section 39 reads the musical-piece data serving as a content, stored in the contents storage section 37 and the improvement information stored in the improvement-information storage section 38; and performs improvement processing for improving the sound quality of the musical-piece data read from the contents storage section 37 by using the improvement information read from the improvement-information storage section 38. The improvement processing section 39 applies digital-to-analog (D/A) conversion to the musical-piece data having an improved sound quality, obtained by the improvement processing, and outputs from a speaker (not shown).

As described above, there are a plurality of types of improvement-information pieces, and improvement processing for improving the sound quality of musical-piece data cannot be performed in some cases only with a certain type of improvement-information piece. In the case in which bits obtained by dividing the low-order bits of the original data of musical-piece data into a plurality of portions are used as improvement information as described by referring to FIG. 4, even if B14 and B15, for example, which are further lower-order bits, are obtained, when B6 to B13, which are higher-order bits than B14 and B15 are not obtained, the sound quality of the musical-piece data cannot be improved. Therefore, the improvement information processing section 39 performs improvement processing only when improvement information required for improving sound quality is stored in the improvement-information storage section 38, and outputs musical-piece data stored in the contents storage section 37 without applying improvement processing when the required improvement information is not stored.

The types of improvement-information pieces can be recognized by the improvement-information identification information stored in the improvement-information storage section 38. The improvement processing section 39 determines according to the improvement-information identification information whether improvement information required for improvement processing is stored in the improvement-information storage section 38.

A communication control section 40 performs communication control through network 3. More specifically, the communication control section 40 requests necessary improvement information from the management center 4 through the network 3. In addition, the communication control section 40 receives improvement information and others sent from the management center 4 in response to the request, sends them to the improvement-information storage section 38, and stores them in it. Furthermore, the communication control section 40 reads improvement information and others stored in the improvement-information storage section 38 in response to a request sent from the management center 4, and sends them to the management center 4 through the network 3.

When the user terminal 2 obtains musical-piece data and others offered through the network 3 by the contents provider 1, the communication control section 40 receives the data stream shown in FIG. 2. In the same way as when the optical disk 10 is read, the musical-piece data is sent to the contents storage section 37 and stored, and contents identification information, improvement-information identification information, and improvement information are sent to the improvement-information storage section 38 and stored.

A control section 41 is connected to an operation section 42 and to a display section 43. The operation section 42 is operated to specify an operation at the user terminal 2 or to switch the operation. In other words, when the operation section 42 is operated, the operation signal corresponding to the operation is sent to the control section 41, the control section 41 generates a control signal according to the operation signal, and sends it to a necessary block. With this control, the user terminal 2 is controlled to perform the desired operation (process). The display section 43 receives a display signal from the control section 41 to display the operation state of the user terminal 2 and other necessary information.

To allow a user terminal 2 to receive improvement information from another user terminal 2 through the management center 4 and to offer improvement information to another user terminal 2, it is necessary to perform user registration in the management center 4.

Figure 13:
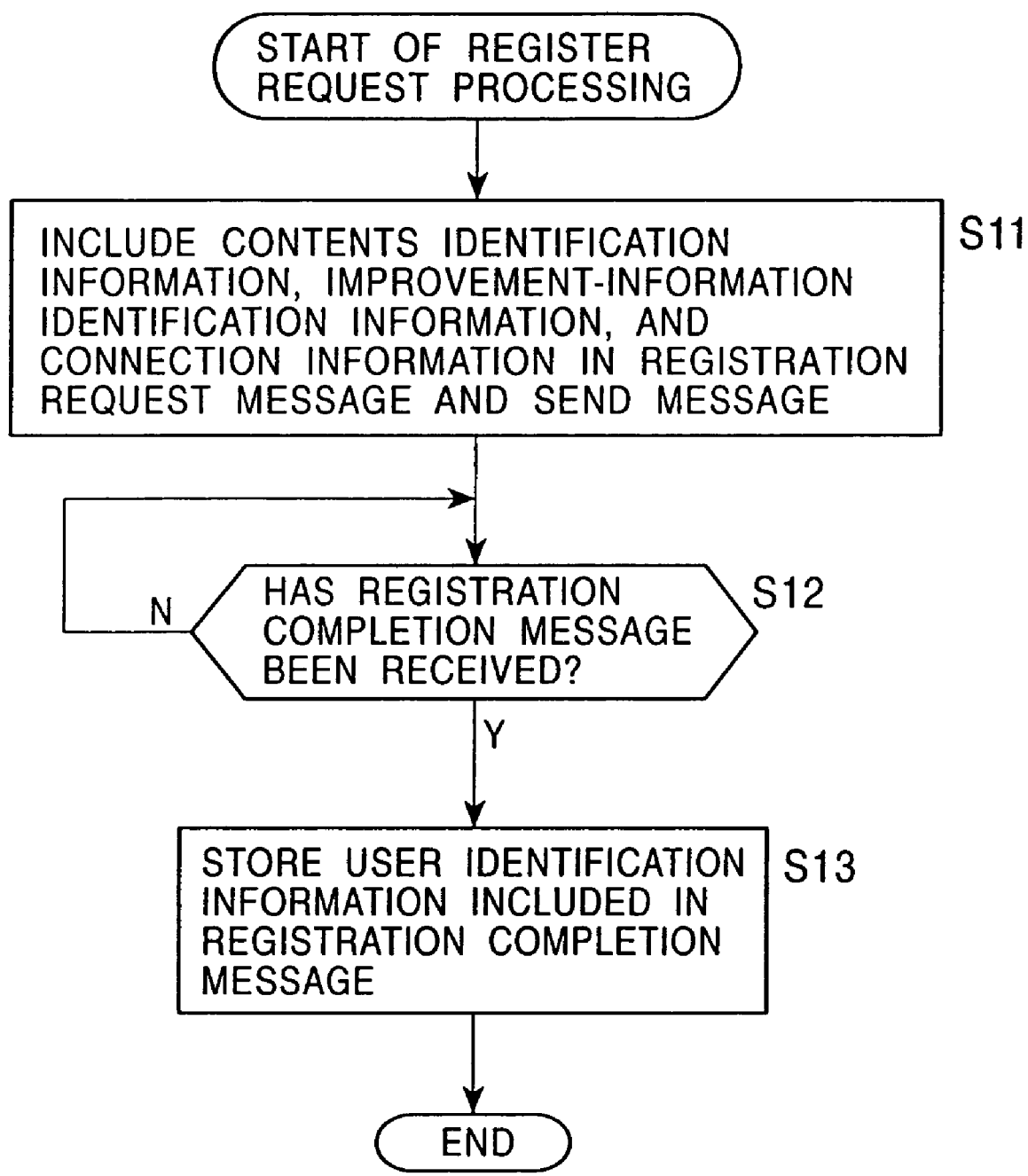
FIG. 13 is a flowchart of registration request processing performed by a user terminal 2.

Registration request processing for requesting user registration from the management center 4 by a user terminal 2 will be described next by referring to a flowchart shown in FIG. 13.

When the user operates the operation section 42 to perform the registration request processing, the control section 41 makes the display section 43 display a message requesting the optical disk 10 to be loaded. When the user of the user terminal 2 loads the optical disk 10 into the user terminal 2, the optical disk 10 is read in the user terminal 2. With this operation, musical-piece data is stored in the contents storage section 37, and contents identification information, improvement-information identification information, and improvement information are stored in the improvement-information storage section 38.

Then, the control section 41 controls the communication control section 40 to establish a communication link with the management center 4 through the network 3.

In step S11, the communication control section 40 reads the contents identification information and improvement-information identification information stored in the improvement-information storage section 38, and includes them in a registration request message which requests user registration. In addition, the communication control section 40 includes information (hereinafter called connection information, if necessary) required for the management center 4 to access the user terminal 2 through the network 3, such as a telephone number and an Internet Protocol (IP) address, in the registration request message, and sends the message to the management center 4 through the network 3.

The management center 4 performs user registration processing, described later, in response to the registration request message sent from the user terminal 2; includes user identification information used for identifying the user terminal 2 in a registration completion message indicating that user registration has been completed; and sends the message. In step S12, the communication control section 40 determines whether it has received the registration completion message from the management center 4.

When it is determined in step S12 that the registration completion message has not yet been received, the processing returns to step S12. When it is determined in step S12 that the registration completion message has been received, in other words, when the communication control section 40 has received the registration completion message sent from the management center 4, the processing proceeds to step S13, and the communication control section 40 stores the user identification information included in the registration completion message in a memory (not shown) built in the communication control section 40. Then, the communication control section 40 disconnects the communication link with the management center 4 and finishes the registration request processing.

Reproduction processing of musical-piece data, performed by a user terminal 2 will be described next in detail by referring to a flowchart shown in FIG. 14.

When the user loads the optical disk 10 into a user terminal 2 and operates the operation section 42 to read data from the optical disk 10, for example, the control section 41 controls a necessary block to reproduce from the optical disk 10 musical-piece data, contents identification information, improvement-information identification information, and improvement information stored in the optical disk 10, in step S21. As described above, the musical-piece data is stored in the contents storage section 37, and the contents identification information, the improvement-information identification information, and the improvement information are stored in the improvement-information storage section 38.

Then, the processing proceeds to step S22, and the improvement processing section 39 refers to the improvement-information identification information stored in the improvement-information storage section 38 to determine whether a type of improvement information is missing in order to improve the sound quality of the musical-piece data stored in the contents storage section 37. When the improvement processing section 39 determines that no type of improvement information is missing, in other words, when all types of improvement information required for improving the sound quality of the musical-piece data stored in the contents storage section 37 have already been obtained by improvement-information acquisition processing, described below, and stored in the improvement-information storage section 38, steps from S23 to S25 are skipped and the processing proceeds to step S26.

In step S26, the improvement processing section 39 uses all the types of improvement information stored in the improvement-information storage section 38 to improve the sound quality of the musical-piece data stored in the contents storage section 37. The processing proceeds to step S27, and the musical-piece data of which the sound quality has been improved is output. The reproduction processing is finished.

Therefore, in this case, the musical-piece data of which the sound quality has been improved as much as possible is output.

When it is determined in step S22 that a type of improvement information is missing, the processing proceeds to step S23, and the control section 41 determines whether it requests the type of improvement information missing from the management center 4 (from another user terminal 2 through the management center 4).

More specifically, the control section 41 makes the display section 43 display an inquiry message indicating whether to request the improvement information, and determines whether to request the improvement information according to a user response to the inquiry message.

When the improvement information is requested from the management center 4 and the user terminal 2 obtains the improvement information, the management center 4 collects money as the consideration of the improvement information, as described later. Depending on the user, the acquisition of the improvement information is not desired. Therefore, it is determined in step S23 whether the improvement information is required or not.

When it is determined in step S23 that the improvement information is required, in other words, when the user operates the operation section 42 to request the improvement information in response to the inquiry message, the processing proceeds to step S24. Improvement-information acquisition processing, described later, is performed and the processing proceeds to step S25.

In step S25, the improvement-information processing section 39 refers to the improvement-information storage section 38 to determine whether all types of improvement-information pieces are collected by the improvement-information acquisition processing performed in step S24. When it is determined that all types of improvement-information pieces have been collected, in other words, when all types of improvement-information pieces required for improving the sound quality of the musical-piece data stored in the contents storage section 37 are stored in the improvement-information storage section 38, the processing proceeds to step S26.

Also in this case, as described before, in step S26, the improvement processing section 39 uses all the types of improvement information stored in the improvement-information storage section 38 to improve the sound quality of the musical-piece data stored in the contents storage section 37. The processing proceeds to step S27, and the musical-piece data of which the sound quality has been improved is output. The reproduction processing is finished.

Therefore, also in this case, the musical-piece data of which the sound quality has been improved as much as possible is output.

When the user operates the operation section 42 in response to the inquiry message so as not to request the improvement information and it is determined in step S23 that the improvement information is not required, or when it is determined in step S25 that all types of improvement-information pieces have not yet collected even if the improvement-information acquisition processing was performed in step S24, the processing proceeds to step S28. The improvement processing section 39 determines whether it is possible to perform improvement processing for improving the sound quality of the musical-piece data by using only improvement information currently stored in the improvement-information storage section 38.

When it is determined in step S28 that it is impossible to perform improvement processing by using only the improvement information currently stored in the improvement-information storage section 38, step S26 is skipped and the processing proceeds to step S27. The improvement-processing section 39 reads the musical-piece data stored in the contents storage section 37, and outputs it as is without applying the improvement processing. The reproduction processing is finished.

Therefore, in this case, the musical-piece data having a low sound quality or a normal sound quality is output.

When it is determined in step S28 that it is possible to perform the improvement processing by using only the improvement information currently stored in the improvement-information storage section 38, the processing proceeds to step S26. The improvement processing section 39 uses the improvement information stored in the improvement-information storage section 38 to improve the sound quality of the musical-piece data stored in the contents storage section 37. The processing proceeds to step S27, and the improvement processing section 39 outputs the musical-piece data of which the sound quality has been improved. The reproduction processing is finished.

Therefore, in this case, the musical-piece data of which the sound quality has been improved within the range corresponding to the improvement information stored in the improvement-information storage section 38 is output.

The improvement-information acquisition processing to be performed in step S24 in FIG. 14 will be described next by referring to a flowchart shown in FIG. 15.

The communication control section 40 first establishes a communication link with the management center 4 through the network 3. Then, in step S31, the communication control section 40 reads the contents identification information and improvement-information identification information, and includes them in an improvement-information request message for requesting improvement information. In addition, the communication control section 40 reads the user identification information stored in the memory built in the communication control section 40, includes the user identification information in the improvement-information request message, and sends the message to the management center 4 through the network 3.

When the management center 4 receives the improvement-information request message, it determines whether it is possible to provide the improvement information requested by the improvement-information request message, as described later. When it is possible, the management center 4 sends the improvement information to the user terminal 2 through the network 3, and when it is not possible, the management center 4 sends an providing-impossible message indicating that the improvement information cannot be offered, to the user terminal 2 through the network 3. The communication control section 40 determines in step S32 whether it has received the providing-impossible message from the management center 4.

When it is determined in step S32 that the communication control section 40 has received the providing-impossible message, in other words, when the communication control section 40 has received the providing-impossible message from the management center 4, the management center 4 disconnects the communication link with the management center 4, steps from S33 to S35 are skipped, and the improvement-information acquisition processing is finished (returning to the main program is performed).

When it is determined in step S32 that the communication control section 40 has not received the providing-impossible message, in other words, when the management center 4 has sent the improvement information requested by the improvement-information request message and other necessary information (such as improvement-information identification information used for identifying the improvement information and contents identification information used for identifying the musical-piece data of which the sound quality is to be improved by the improvement information), the processing proceeds to step S33, the communication control section 40 receives the improvement information and others from the management center 4, and it determines whether receiving has been performed successfully.

Whether the user terminal 2 has successfully received the information from the management center 4 can be determined, for example, by comparing the size sent from the management center 4 before the management center 4 sends the information, of the information to be sent from the management center 4, with the size of the information actually received from the management center 4.

When it is determined in step S33 that the improvement information and others have not successfully been received from the management center 4, the processing proceeds to step S34, and the communication control section 40 requests re-transmission of the improvement information and others from the management center 4. The processing returns to step S33 and subsequent processes are performed again.

When it is determined in step S33 that the improvement information and others have successfully been received from the management center 4, the processing proceeds to step S35, and the communication control section 40 sends the improvement information and others successfully received to the improvement-information storage section 38 and stores them in it. The processing proceeds to step S36. In step S36, the communication control section 40 sends a successful-receiving message indicating that the information has been successfully received to the management center 4. Then, the management center 4 disconnects the communication link. The improvement-information acquisition processing is finished.

Figure 14:
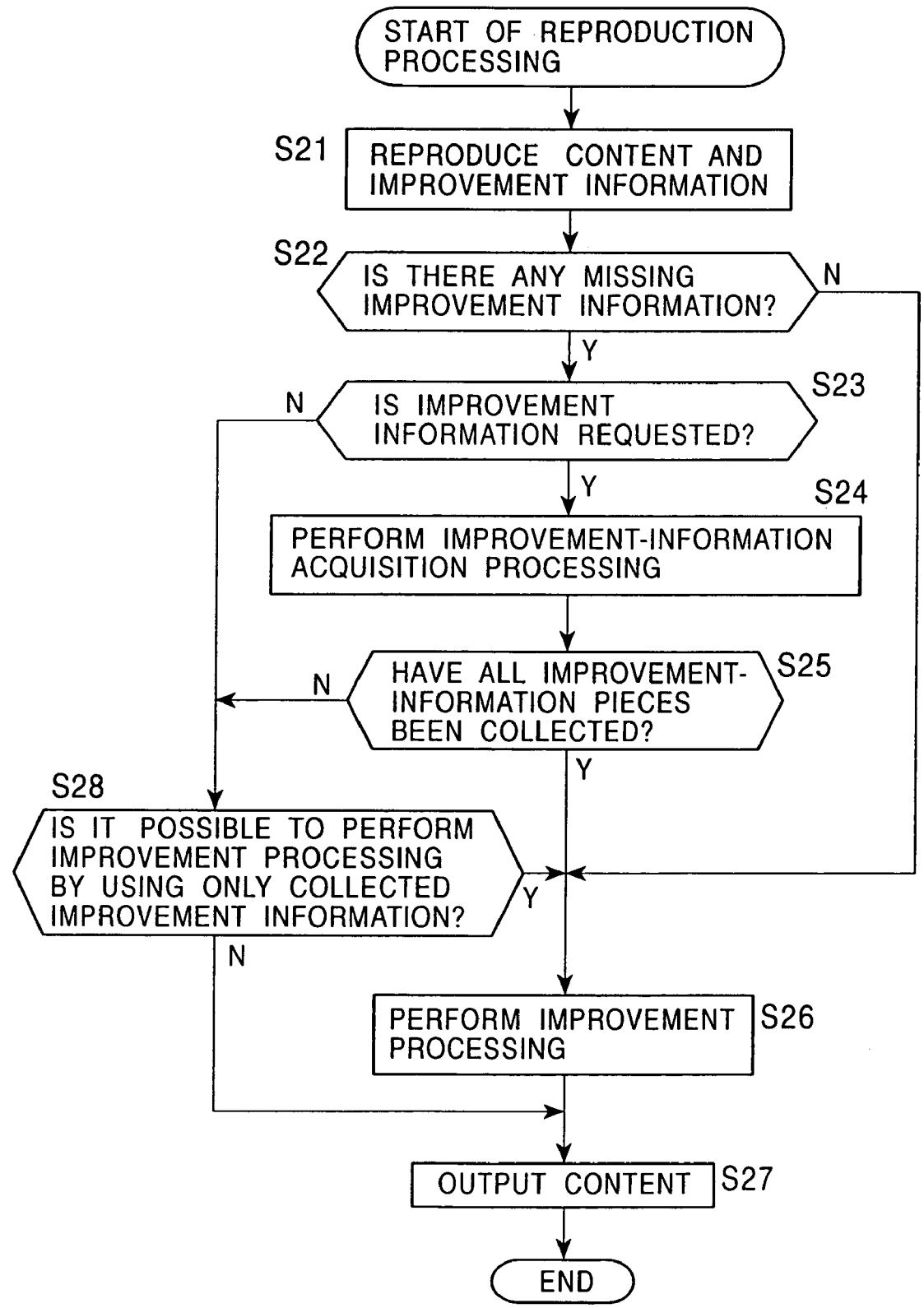
FIG. 14 is a flowchart of reproduction processing performed by a user terminal 2 for data on an optical disk 10.

The improvement-information acquisition processing, described above, is performed in the reproduction processing shown in FIG. 14. In addition, the improvement-information acquisition processing can also be performed according to a user request.

When the improvement information is requested from the management center 4 by the improvement-information request message sent from the user terminal 2, the management center 4 obtains the improvement information from another user terminal 2 and sends it to the user terminal 2 which has requested it. This means that the another user terminal 2 provides the management center 4 with the improvement information.

Improvement-information providing processing in which a user terminal 2 provides the management center 4 with improvement information will be described next by referring to a flowchart shown in FIG. 16.

When the communication control section 40 receives a request for improvement information, sent from the management center 4 as described later, the user terminal 2 reads data from the optical disk 10 as described above in step S41, and stores musical-piece data in the contents storage section 37 and contents identification information, improvement-information identification information, and improvement information in the improvement-information storage section 38.

The processing proceeds to step S42. The communication control section 40 reads the contents identification information, the improvement-information identification information, and the improvement information stored in the improvement-information storage section 38, and sends them to the management center 4 together with user identification information stored in the memory built in the communication control section 40. The processing proceeds to step S43.

In step S43, the communication control section 40 determines whether it has received a re-transmission request from the management center 4. When the communication control section 40 determines that it has received the request, the processing returns to step S42, and subsequent processes are performed again.

When the communication control section 40 determines in step S43 that it has not received the request, the improvement-information providing processing is finished.

Figure 17:
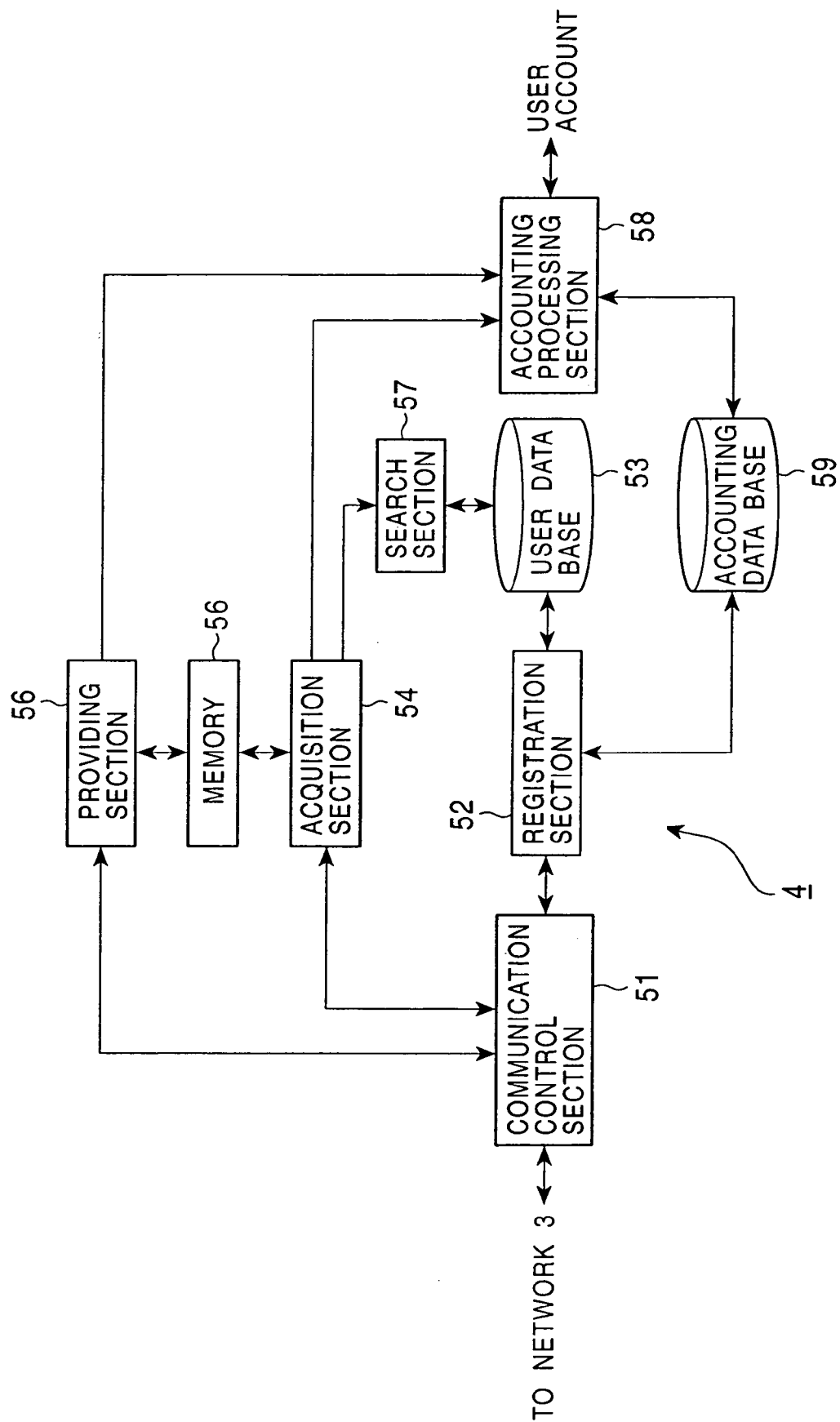
FIG. 17 is a block diagram showing an example structure of a management center 4.

FIG. 17 shows an example structure of the management center 4 shown in FIG. 1.

A communication control section 51 performs communication control through the network 3 to receive necessary data from a registration section 52, an acquisition section 54, or a providing section 56 and send it to the network 3, and to receive data from the network 3 and send it to the registration section 52, the acquisition section 54, or the providing section 56.

The registration section 52 stores information required for user registration in a user data base 53 and an accounting data base 59 according to data sent from the communication control section 51. The registration section 52 also issues user identification information at user registration and sends it to the communication control section 51.

The user data base 53 relates necessary information to the user identification information issued to the user terminal 2 and stores them.

The acquisition section 54 performs control in order to obtain improvement information from the user terminal 2 according to data sent from the communication control section 51. In other words, the acquisition section 54 controls a search section 57 to detect the user who owns an optical disk 10 in which the necessary improvement information has been stored. The acquisition section 54 also controls the communication control section 51 to obtain the improvement information and others from the user terminal 2 of the user and to send them to a memory 55 and store in it. The acquisition section 54 also sends user identification information for identifying the user terminal 2 which has obtained the improvement information and others to an accounting processing section 58.

The memory 55 temporarily stores the improvement information and others sent from the acquisition section 54.

The providing section 56 reads the improvement information and others stored in the memory 55, and controls the communication control section 51 to send the improvement information and others to the user terminal 2. The providing section 56 also sends user identification information for identifying the user terminal 2 which has provided the improvement information to the accounting processing section 58.

The search section 57 searches the user data base 53 for information (user information) related to the user who owns the necessary information under the control of the acquisition section 54, and sends the information to the acquisition section 54.

The accounting processing section 58 performs accounting processing for the user of the user terminal 2 determined from user identification information sent from the acquisition section 54 or the providing section 56 by referring to the accounting data base 59. The accounting data base 59 stores accounting information required for the accounting processing performed by the accounting processing section 58.

Figure 18:
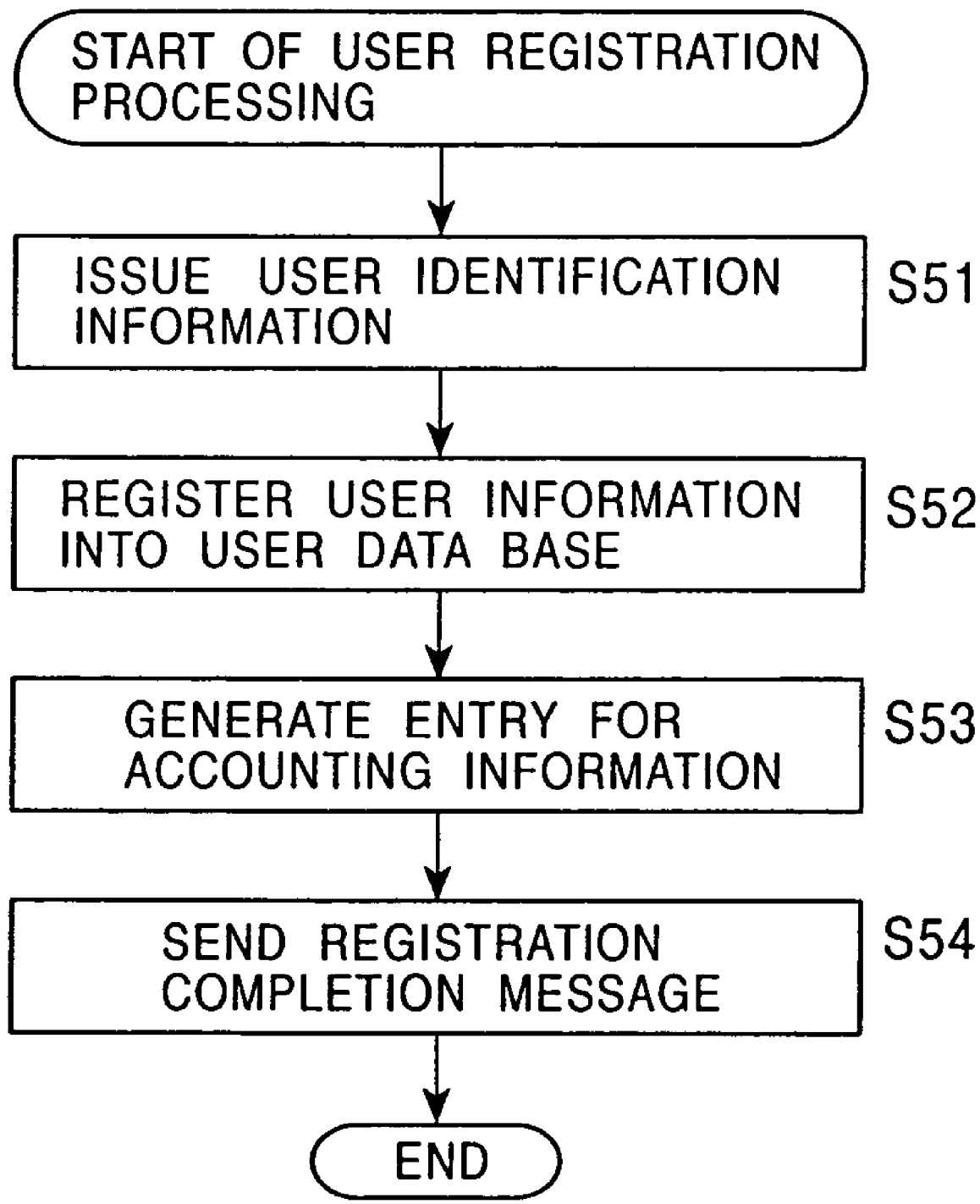
FIG. 18 is a flowchart of user registration processing performed by the management center 4.

When the management center 4 structured as described above receives a registration request message from a user terminal 2, as described above by referring to FIG. 13, the management center 4 performs user registration processing according to a flowchart shown in FIG. 18.

A registration request message sent from the user terminal 2 is received by the communication control section 51 and sent to the registration section 52. When the registration section 52 receives the registration request message, the registration section 52 issues a unique user identification information in step S51. The processing proceeds to step S52. In step S52, the registration section 52 relates the contents identification information, the improvement-information identification information, and the connection information included in the registration request message sent from the communication control section 51, to the user identification information issued in step S51 to generate user information, sends the user information to the user data base 53, and registers the user information in the user data base 53.

The processing proceeds to step S53. The registration section 52 makes an entry for storing the user accounting information corresponding to the user identification information issued in step S51, in the accounting data base 59. The processing proceeds to step S54.

In step S54, the registration section 52 includes the user identification information issued in step S51 in a registration completion message indicating that user registration has been completed, sends the message to the communication control section 51, and makes the communication control section 51 send the registration completion message to the user terminal 2 which sent the registration request message. The user registration processing is finished.

Figure 19:
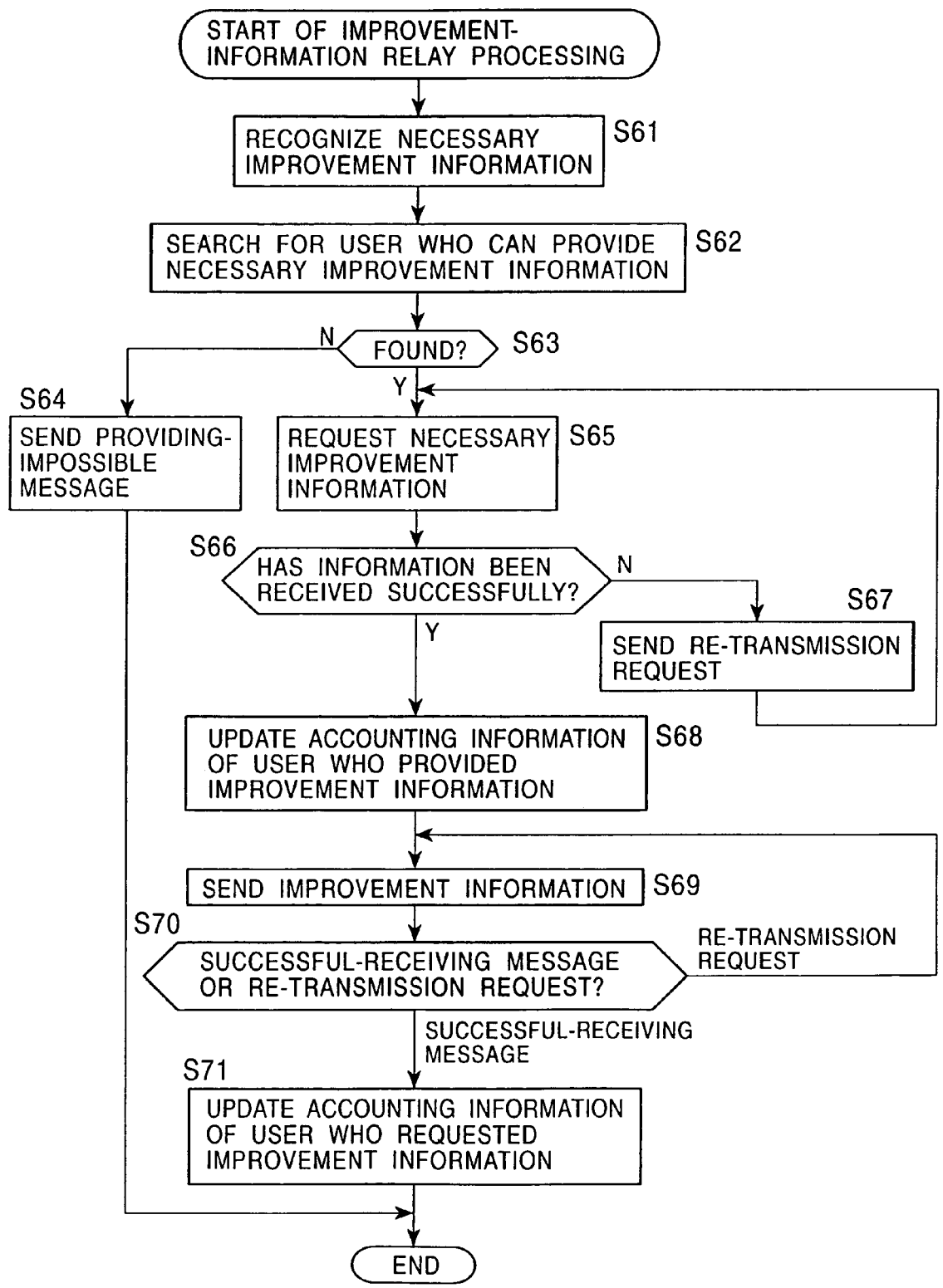
FIG. 19 is a flowchart of improvement-information relay processing performed by the management center 4.

As described above, when the user terminal $2_k$ which has finished user registration sends a request for improvement information, the management center 4 obtains the improvement information from another user terminal $2_m$ which has finished user registration, and performs processing (hereinafter called improvement-information relay processing) for providing the user terminal $2_k$ with the improvement information. The improvement-information relay processing will be described below by referring to a flowchart shown in FIG. 19.

As described above by referring to FIG. 15, when the user terminal $2_k$ sends an improvement-information request message to the management center 4, the improvement-information request message is received by the communication control section 51, and the improvement-information relay processing is started.

The communication control section 51 sends the received improvement-information request message to the acquisition section 54. The acquisition section 54 recognizes requested improvement information according to the improvement-information request message in step S61.

The improvement-information request message includes contents identification information and improvement-information identification information, as described above. The musical-piece data of which the sound quality is to be improved by the user terminal $2_k$ which sent the improvement-information request message can be identified according to the contents identification information. A type of improvement information already obtained by the user terminal $2_k$ which sent the improvement-information request message can be identified according to the improvement-information identification information. Therefore, according to the contents identification information and the improvement-information identification information included in the improvement-information request message, improvement information requested by the user terminal $2_k$ which sent the improvement-information request message, that is, improvement information required for improving the sound quality of the musical-piece data of which the sound quality is to be improved by the user terminal $2_k$ but not yet obtained by the user terminal $2_k$ (not yet stored in the improvement-information storage section 38 (FIG. 12)) can be recognized.

When the acquisition section 54 recognizes the improvement information requested by the user terminal $2_k$, in step S61, the processing proceeds to step S62 and the acquisition section 54 controls the search section 57 so as to search for a user terminal 2 which owns the improvement information.

The search section 57 searches for a user terminal 2 which owns the improvement information requested by the user terminal $2_k$ by referring to the user data base 53. More specifically, the search section 57 refers to contents identification information and improvement-information identification information stored in the user data base 53 to search for a user terminal 2 which owns the improvement information requested by the user terminal $2_k$, and sends the result of searching to the acquisition section 54.

The acquisition section 54 determines from the result of searching sent from the search section 57 whether there is a user terminal 2 which owns the improvement information requested by the user terminal $2_k$. When it is determined that there is not such a user terminal 2, in other words, when the search section 57 cannot obtain the user identification information of a user terminal 2 which owns the improvement information requested by the user terminal $2_k$, the processing proceeds to step S64 and the acquisition section 54 controls the communication control section 51 to send a providing-impossible message indicating that the improvement information cannot be requested, to the user terminal $2_k$ which has requested the improvement information. The improvement-information relay processing is terminated.

When it is determined in step S63 that there exists such a terminal 2 which owns the improvement information requested by the user terminal $2_k$, in other words, when the search section 57 has obtained the user identification information of a user terminal 2 which owns the improvement information requested by the user terminal $2_k$, the processing proceeds to step S65 and the acquisition section 54 controls the communication control section 51 to request the improvement information requested by the user terminal $2_k$, from the user terminal $2_m$ identified by the user identification information obtained by the search section 57.

In this case, the communication control section 51 establishes a communication link with the user terminal $2_m$ identified by the user identification information, according to the connection information related to the user identification information obtained by the search section 57, and requests the improvement information requested by the user terminal $2_k$.

There is a case in which the user terminal $2_k$ requests a plurality of types of improvement-information pieces, and different user terminals 2 own the plurality of types of improvement-information pieces. In this case, the processes of step S65 to step S68, described later, are executed for each of the different terminals 2.

There is also a case in which a plurality of user terminals 2 own a type of improvement information requested by the user terminal $2_k$. In this case, the type of improvement information can be requested from one of the plurality of user terminals 2. One of the plurality of user terminals 2 is selected by randomly selecting one user terminal 2 or by selecting, for example, a user terminal 2 which needs the minimum communication charge. It is also possible to select a user terminal 2 which provides the highest communication quality.

When a plurality of user terminals 2 own a type of improvement information requested, instead of selecting one among the plurality of user terminals 2 as described above, two or more (even all) user terminals can be selected. When two or more user terminals 2 are selected, it is possible that an identical type of improvement information is obtained from each of the two or more user terminals. When two or more user terminals 2 are selected, it is also possible that all of identical types of improvement information are obtained from each of the two or more user terminals 2. In this case, robustness of improvement information is improved. In other words, even if communication quality is poor, since all of identical types of improvement information are obtained from each of the two or more user terminals 2, if an error occurs during transmission or receiving of improvement information, the error is corrected and correct improvement information is obtained.

In the present embodiment, to make a description simple, when a plurality of user terminals 2 own a type of improvement information requested, it is assumed as described above that one user terminal $2_m$ is selected among the plurality of user terminals 2, and improvement information is requested from the one user terminal $2_m$ in step S65.

Figure 16:
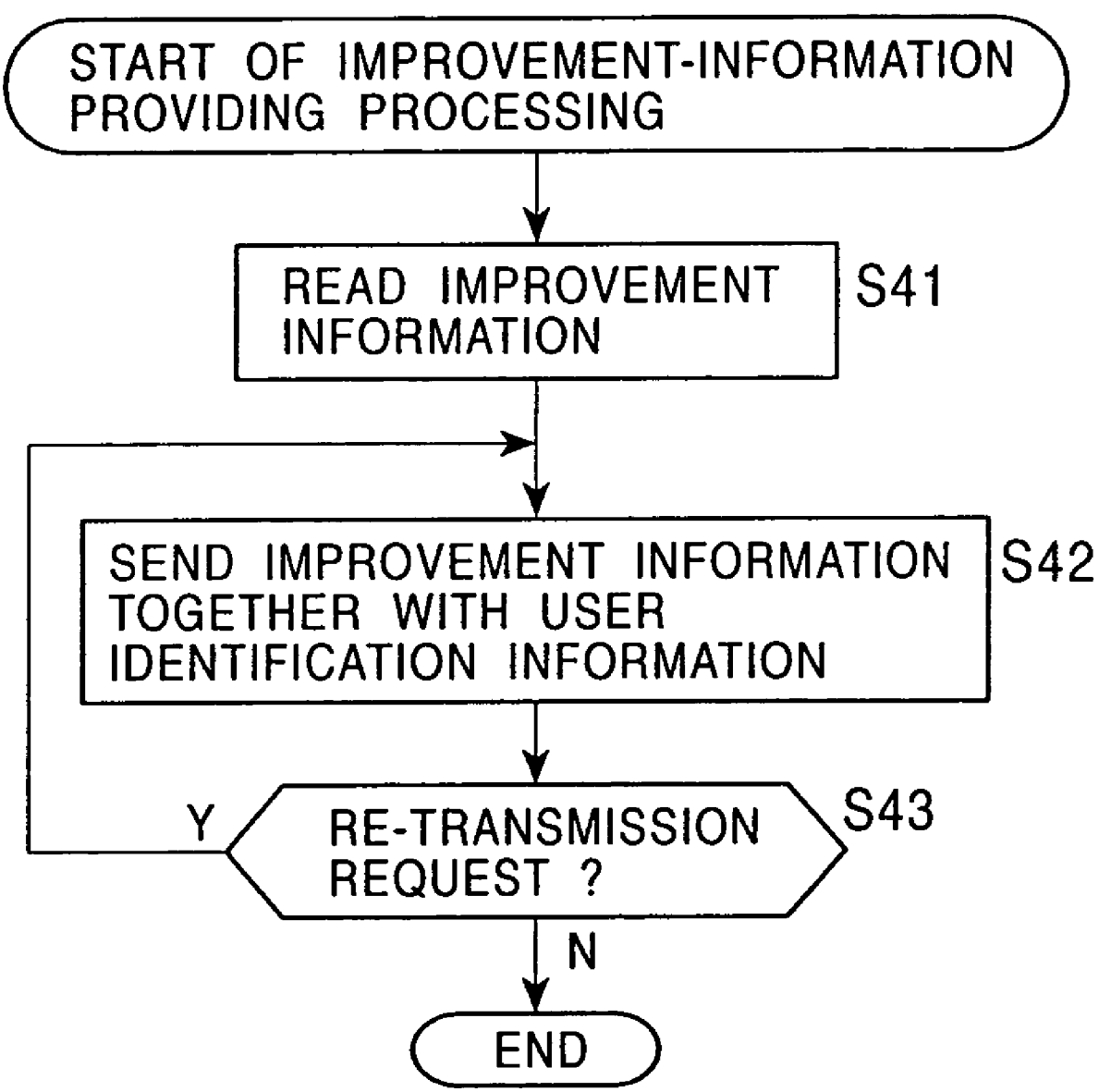
FIG. 16 is a flowchart of improvement-information providing processing performed by a user terminal 2.

When a request for improvement information is sent to the user terminal $2_m$ in step S65 and the user terminal $2_m$ receives the request for improvement information, the user terminal $2_m$ performs the improvement-information providing processing, described by referring to FIG. 16, to send the improvement information requested in step S65 to the management center 4 together with its improvement-information identification information, contents identification information, and user identification information. The communication control section 51 receives the improvement information and others sent in that way.

The processing proceeds to step S66, and the communication control section 51 determines whether it has successfully received the improvement information and others sent from the user terminal $2_m$. When it is determined in step S66 that the improvement information and others sent from the user terminal $2_m$ have not been successfully received, the processing proceeds to step S67 and the communication control section 51 sends a re-transmission request to the user terminal $2_m$. Then, the processing returns to step S65.

When it is determined in step S66 that the improvement information and others sent from the user terminal $2_m$ have been successfully received, the communication control section 51 sends the improvement information and others successfully received to the acquisition section 54. When the acquisition section 54 receives the improvement information and others from the communication control section 51, it sends them to the memory 55 and stores them in the memory 55. The processing proceeds to step S68, and the acquisition section 54 sends the user identification information of the user terminal $2_m$, sent together with the improvement information to the accounting processing section 58 to make the accounting processing section 58 execute accounting processing and update the accounting information of the accounting data base 59.

More specifically, the accounting processing section 58 reads the accounting information specified by the user identification information sent from the acquisition section 54, from the accounting data base 59, and calculates a charge for the improvement information obtained from the user terminal $2_m$. In addition, the accounting processing section 58 adds the calculated charge to the accounting information read from the accounting data base 59, and writes the new accounting information obtained by this addition to the accounting data base 59 in an overwriting manner.

Then, the processing proceeds to step S69, and the providing section 56 reads the improvement information from the memory 55 together with its improvement-information identification information and the contents identification information, and controls the communication control section 51 to send the improvement information to the user terminal $2_k$. Then, the processing proceeds to step S70.

Figure 15:
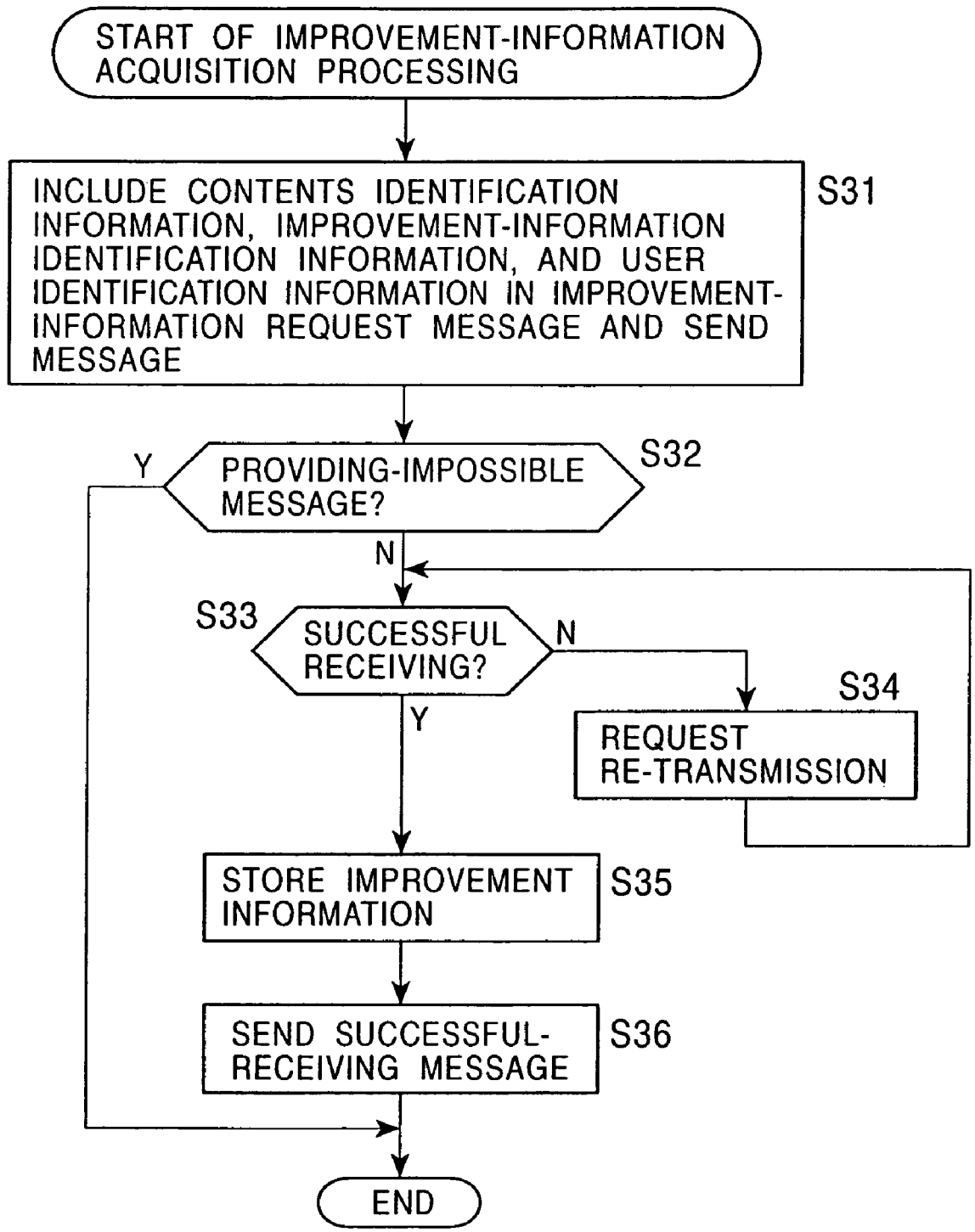
FIG. 15 is a flowchart of improvement-information acquisition processing performed by a user terminal 2.

Since the user terminal $2_k$ sends a re-transmission request or a successful-receiving message, as described in the improvement-information acquisition processing by referring to FIG. 15, the communication control section 51 determines in step S70 whether the user terminal $2_k$ has sent a re-transmission request or a successful-receiving message. When it is determined in step S70 that a re-transmission request has been sent, the processing returns to step S69, and the improvement information and others stored in the memory 55 are re-transmitted.

When it is determined in step S70 that a successful-receiving message has been sent, the processing proceeds to step S71, and the providing section 56 recognizes the user identification information of the user terminal $2_k$ to which the improvement information was sent (provided), from the improvement-information request message received by the communication control section 51, and sends it to the accounting processing section 58. The accounting processing section 58 executes the accounting processing, and updates the accounting information of the accounting data base 59. The improvement-information relay processing is terminated.

More specifically, the accounting processing section 58 reads the accounting information specified by the user identification information sent from the providing section 56, from the accounting data base 59, and calculates a charge to be collected for the improvement information sent to the user terminal $2_k$. In addition, the accounting processing section 58 adds the calculated charge to the accounting information read from the accounting data base 59, and writes the new accounting information obtained by this addition to the accounting data base 59 in an overwriting manner.

Then, the accounting processing section 58, for example, transfers the money for providing the improvement information to the bank account of the user who provided it, or charges the money for purchasing the improvement information directly to the bank account of the user who purchased it.

The accounting processing can be performed by the accounting processing section 58, for example, in the following way.

When low-order bits of the original data of musical-piece data are divided into a plurality of bits and used as improvement information as described by referring to FIG. 4, it is expected that among the low-order bits serving as the improvement information, the lower a bit is, the lower the probability (the need) of providing the bit for other user terminals 2 is, and the higher a bit is, the higher the probability (the need) of providing the bit for other user terminals 2 is. It is possible that a charge for lower bits among the low-order bits serving as the improvement information is set low and a charge for higher bits among the low-order bits serving as the improvement information is set high. It is also possible that a purchase charge for an optical disk 10 in which lower bits are recorded among the low-order bits serving as the improvement information is set low and a purchase charge for an optical disk 10 in which higher bits are recorded among the low-order bits serving as the improvement information is set high. In this case, even if the optical disk 10 is expensive, since the optical disk 10 stores improvement information which is to be requested by another user terminal 2 at a high possibility, the user who purchased it can provide the improvement information to reimburse a part or the whole of the money paid for the expensive optical disk 10 as an information providing fee.

It is also possible that the management center 4 does not execute accounting processing, that is, the information providing fee of improvement information and the purchase charge thereof are set free; and unlike the case described above, a purchase charge for an optical disk 10 in which lower bits are recorded among the low-order bits serving as the improvement information is set high and a purchase charge for an optical disk 10 in which higher bits are recorded among the low-order bits serving as the improvement information is set low. In this case, the purchase charge for the optical disk 10 which stores improvement information to be requested by other user terminals 2 at a high possibility is low, but it is necessary to frequently provide other user terminals 2 with the recorded improvement information. The purchase charge for the optical disk 10 which stores improvement information to be requested by other user terminals 2 at a low possibility is high, but it is not necessary to frequently provide other user terminals 2 with the recorded improvement information.

In a case in which the management center 4 executes the accounting processing, when an identical type of improvement information is obtained from a plurality of user terminals 2, as described above, it is possible that the money to be paid to one user terminal 2 if the improvement information is obtained from the user terminal 2 is equally divided for the plurality of user terminals 2 and paid.

As described above, in the management center 4, user information which includes user identification information identifying the user terminals 2 and improvement-information identifying information identifying improvement information recorded into the optical disks 10 processed by the user terminals 2 are registered into the user data base 53; when a user terminal $2_k$ requests improvement information, another user terminal $2_m$ which can provide necessary improvement information is searched for according to the user information; and the necessary improvement information is obtained from the user terminal $2_m$ searched for and provided for the user terminal $2_k$. Therefore, the users are allowed to buy and sell improvement information for improving the quality of purchased data to and from each other. As a result, a new market is developed and a new business is made.

The series of above-described processing can be executed not only by hardware but also by software. When the series of processing is executed by software, a program constituting the software is installed into a general-purpose computer or the like.

Figure 20:
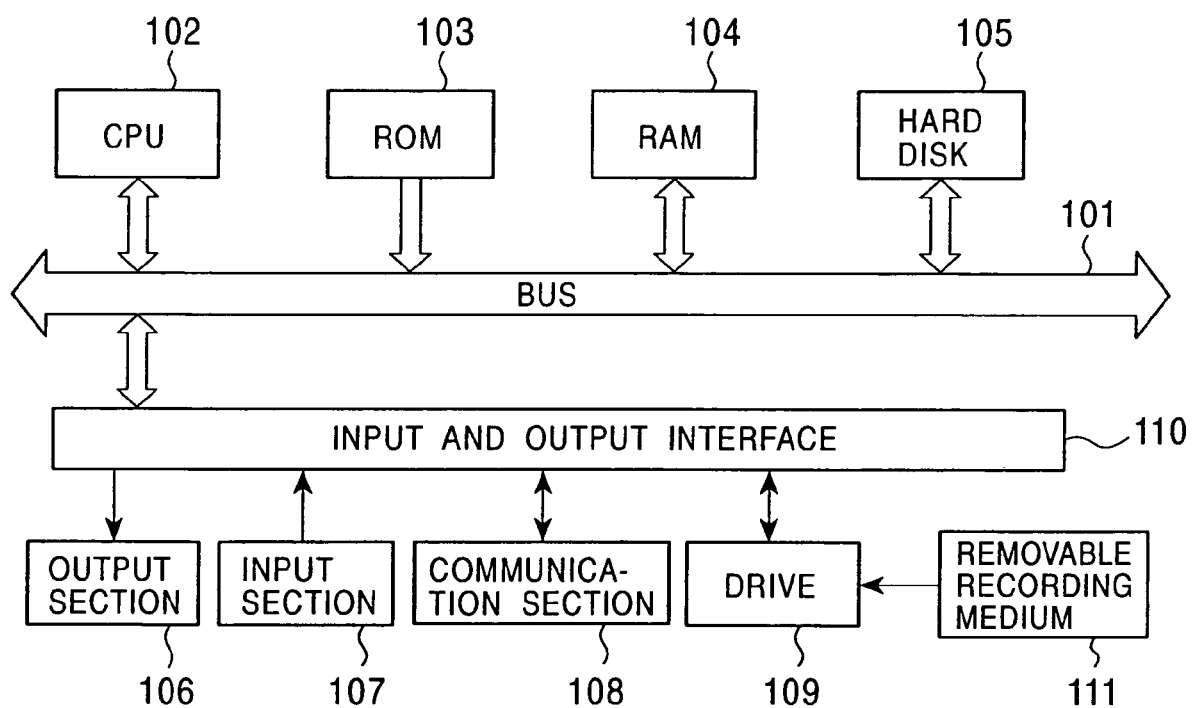
FIG. 20 is a block diagram showing an example structure of a computer according to an embodiment of the present invention.

FIG. 20 shows an example structure of a computer into which a program which executes the series of above-described processing is installed, according to an embodiment.

The program can be recorded in advance into a hard disk 105 or a read-only memory (ROM) 103 serving as a recording medium which is built in the computer.

Alternatively, the program can be stored (recorded) temporarily or perpetually into a removable recording medium 111, such as a floppy disk, a compact disc read-only memory (CD-ROM), a magneto-optical (MO) disk, a digital versatile disk (DVD), a magnetic disk, or a semiconductor memory. Such a removable recording medium 111 can be offered as so-called package software.

The program can be installed into the computer from the removable recording medium 111, described above. Alternatively, the program can be transferred by radio from a downloading site to the computer through an artificial satellite for digital satellite broadcasting, or to the computer by wire through a network such as a local area network (LAN) or the Internet; received by a communication section 108 and installed into the built-in hard disk 105.

The computer includes a central processing unit (CPU) 102. The CPU 102 is connected to an input and output interface 110 through a bus 101. When the user operates an input section 107 formed of a keyboard, a mouse and a microphone to input a command through the input and output interface 105, the CPU 102 executes the program stored in the ROM 103 according to the command. Alternatively, the CPU 102 loads into a random access memory (RAM) 104 the program stored in the hard disk 105; the program transferred through the satellite or the network, received by the communication section 108, and installed into the hard disk 105; or the program read from the removable recording medium 111 loaded into a drive 109, and installed into the hard disk 105; and executes it. The CPU 102 executes the processing according to the above-described flowchart, or executes processing performed by the structure shown in the above-described block diagram. The CPU 102 outputs the processing result, for example, through the input and output interface 110 to an output section 106 formed of a liquid-crystal display (LCD) and a speaker; sends the processing result from the communication section 108; or stores the processing result in the hard disk 105, as required.

In the present specification, the steps describing the program for executing various types of processing are not necessarily processed in a time sequential manner in the order in which the steps are described in the flowcharts. Processing to be executed in parallel or individually, such as parallel processing or processing by objects, is also included.

The program may be executed by one computer. It may be distribution-processed by a plurality of computers. It may also be transferred to a remote computer and executed.

What is claimed is:

1. An information processing apparatus comprising:
    a reading unit configured to read from a recording medium degraded data and first improvement information used for improving the quality of the degraded data, the degraded data having fewer data bits than original data, and first improvement information being first data bits of the original data missing in the degraded data;
    an improvement-information requesting unit configured to request a second improvement information, the second improvement information being second data bits missing from the degraded data; and
    a quality improving unit configured to improve the quality of the degraded data by restoring the first data bits and the second data bits to the degraded data from the respective first improvement information and the second improvement information.

2. An information processing method performed by an information processing terminal, comprising:
    reading from a recording medium degraded data, the degraded data having fewer data bits than original data;
    reading from the recording medium first improvement information, the first improvement information being one or more first data bits of the original data missing in the degraded data;

requesting a second improvement information, the second improvement information being one or more second data bits missing from the degraded data; and improving the quality of the degraded data by restoring the first data bits and the second data bits to the degraded data from the respective first improvement information and the second improvement information.

3. A non-transitory computer-readable medium storing a computer program for performing an information processing method, the method comprising:

reading from a recording medium degraded data, the degraded data having fewer data bits than original data;

reading from the recording medium first improvement information, the first improvement information being one or more first data bits of the original data missing in the degraded data;

requesting a second improvement information, the second improvement information being one or more second data bits missing from the degraded data; and improving the quality of the degraded data by restoring the first data bits and the second data bits to the degraded data from the respective first improvement information and the second improvement information.

* * * * *